United States Patent [19]

Nakauchi et al.

[11] Patent Number: 4,925,591

[45] Date of Patent: May 15, 1990

[54] MESOMORPHIC COMPOUND HAVING β-HYDROXYCARBOXYL GROUP AS CHIRAL SOURCE AND LIQUID CRYSTAL COMPOSITION

[75] Inventors: Jun Nakauchi, Tokyo; Mioko Uematsu, Kawasaki; Keiichi Sakashita, Akishima; Yoshitaka Kageyama, Tokyo; Seiji Hayashi, Kawasaki; Kenji Mori, Tokyo, all of Japan

[73] Assignee: Mitsubishi Rayon Co., Ltd., Tokyo, Japan

[21] Appl. No.: 288,379

[22] Filed: Dec. 22, 1988

[30] Foreign Application Priority Data

Dec. 22, 1987 [JP] Japan .................. 62-324532
Jan. 28, 1988 [JP] Japan .................. 63-18436

[51] Int. Cl.⁵ .............. C09K 19/06; C09K 19/12; C09K 19/20; C07C 69/76
[52] U.S. Cl. .............. 252/299.66; 252/299.67; 252/299.6; 252/299.01; 560/59; 560/66; 560/73; 560/86; 560/138; 560/141; 560/65; 560/83
[58] Field of Search ......... 252/299.01, 299.66, 252/299.67, 299.6; 560/66, 59, 65, 73, 138, 141, 86, 83

[56] References Cited

U.S. PATENT DOCUMENTS

| | | | |
|---|---|---|---|
| 4,668,427 | 5/1987 | Saito et al. | 252/299.66 |
| 4,695,651 | 9/1987 | Higuchi et al. | 252/299.66 |
| 4,710,585 | 12/1987 | Tagachi et al. | 252/299.67 |
| 4,728,458 | 5/1988 | Higuchi et al. | 252/299.65 |
| 4,775,223 | 10/1988 | Yoshinaga et al. | 252/299.66 |

FOREIGN PATENT DOCUMENTS 270244 6/1988 European Pat. Off.

*Primary Examiner*—John F. Terapane
*Assistant Examiner*—J. E. Thomas
*Attorney, Agent, or Firm*—Finnegan, Henderson, Farabow, Garrett & Dunner

[57] ABSTRACT

Disclosed is a mesomorphic compound having a β-hydroxycarboxyl group as the chiral source, which is represented by the formula:

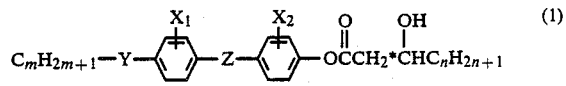

wherein m and n are integers of from 1 to 18, $X_1$ and $X_2$ independently represent fluorine, chlorine or hydrogen, Y represents

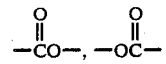

or —O—, Z represents a direct bond,

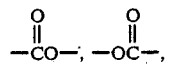

—CH₂O— or —OCH₂—, and * indicates the asymmetric carbon. The mesomorphic compound is valuable as a ferroelectric liquid crystal or an additive to a ferroelectric liquid crystal or to a compound showing the SmC phase and having no chiral group.

2 Claims, 3 Drawing Sheets

MESOMORPHIC COMPOUND HAVING β-HYDROXYCARBOXYL GROUP AS CHIRAL SOURCE AND LIQUID CRYSTAL COMPOSITION

BACKGROUND OF THE INVENTION (1) Field of the Invention

The present invention relates to a novel mesomorphic compound having a β-hydroxycarboxyl group as the chiral source, which is valuable as a ferroelectric liquid crystal or an additive to a ferroelectric liquid crystal, and a liquid crystal composition comprising this liquid crystalline compound.

(2) Description of the Related Art

The liquid crystals currently widely used in a light-receiving type display belongs to the nematic phase, and therefore, the display is characterized in that it does not cause eye fatigue and consumes very little energy. However, this type of display has problems in that the response speed is low and the display cannot be seen from a certain angle.

A display device or printer head using a ferroelectric liquid crystal having advantageous characteristics similar to those of a nematic liquid crystal and having a high response and contrast comparable to those of a light emitting type display element has been investigated.

A ferroelectric liquid crystal was discovered for the first time by R. B. Meyer et al in 1975 [J. Physique, 36, L-69-71 (1975)]. This ferroelectric liquid crystal belongs to the chiral smectic C phase (hereinafter referred to as "Sm*C phase"), and a typical compound of this ferroelectric liquid crystal is p-decyloxybenzylidene-p'-amino-2-methylbutyl cinnamate (hereinafter referred to as "DOBAMBC") represented by the following formula (2):

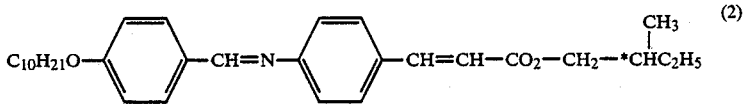

In addition to DOBAMBC, the ferroelectric liquid crystal materials prepared to date have a problem in that the temperature range showing the ferroelectric characteristics (i.e., the temperature range wherein the Sm*C phase is present) is narrow, and therefore, attempts have been made to expand the temperature range showing the Sm*C phase to the lower and higher temperature sides, taking room temperature as the center, by mixing several ferroelectric liquid crystals. Accordingly, the development of a ferroelectric liquid crystal having the Sm*C phase present in a practical temperature range is desired, and further, a ferroelectric crystal having a larger spontaneous polarization than that of the known ferroelectric liquid crystals is desired as a liquid crystal for a printer head for which an ultra-high response speed is required.

SUMMARY OF THE INVENTION

Therefore, a primary object of the present invention is to provide a novel compound which is chemically stable, does not undergo undesirable coloration, has an excellent photostability, exhibits an enhanced spontaneous polarization, and is valuable as a ferroelectric liquid crystal or an additive to a ferroelectric liquid crystal.

Another object of the present invention is to provide a liquid crystal composition useful for a display device and a printer head.

In one aspect of the present invention, there is provided a mesomorphic compound having a β-hydroxycarboxyl group as the cgurak source, which is represented by the following formula (1):

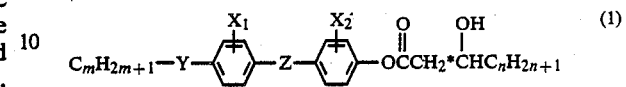

wherein m and n are integers of from 1 to 18, $X_1$ and $X_2$ independently represent fluorine, chlorine or hydrogen, Y represents

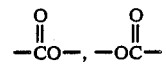

or —O—, Z represents a direct bond,

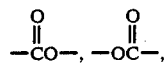

—CH$_2$O, or —OCH$_2$—, and *C represents an asymmetric carbon atom.

In another aspect of the present invention, there is provided a liquid crystal composition comprising at least one of the above-mentioned mesomorphic compounds.

DESCRIPTION OF THE PREFERRED EMBODIMENTS

Figure 1:
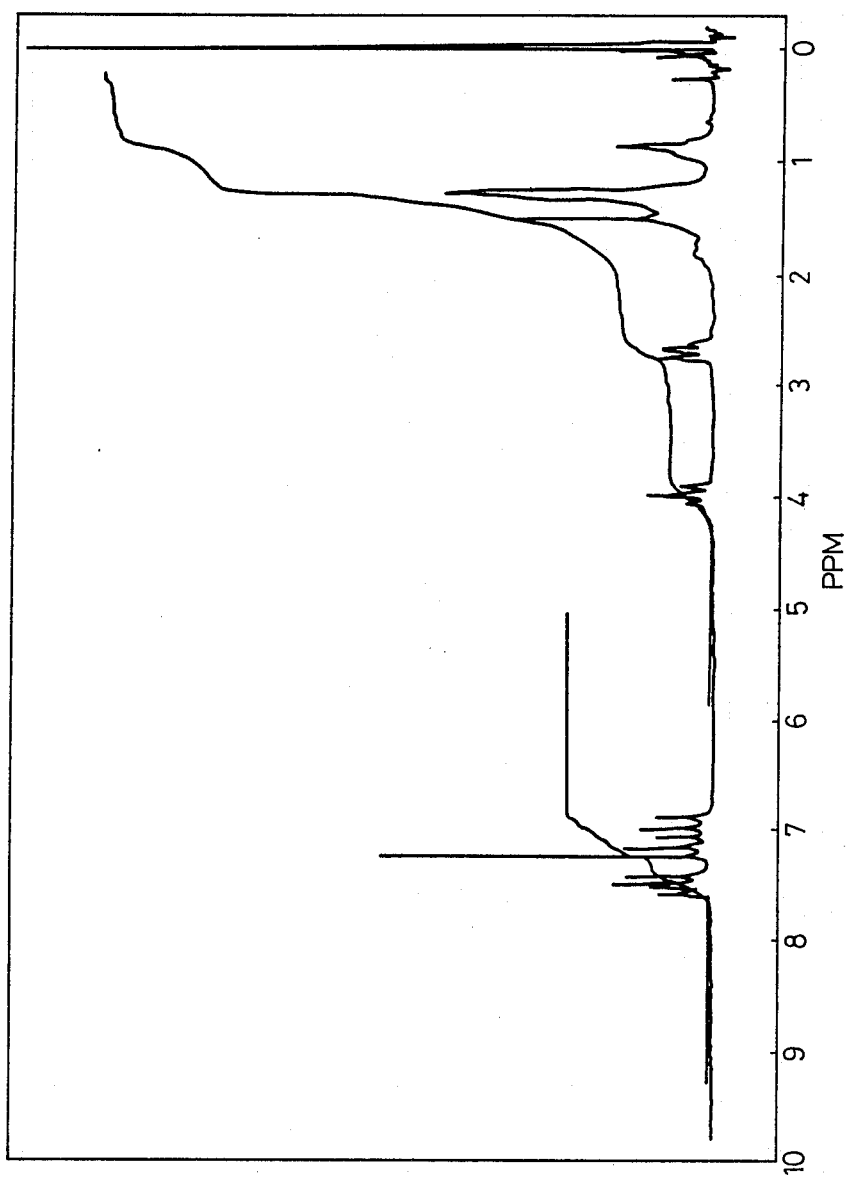
FIGS. 1 and 2 illustrate NMR spectra of examples of the compound of the present invention.

If the carbon numbers m and n of the alkyl groups $C_mH_{2m+1}$ and $C_nH_{2n+1}$ in the formula (1) are 19 or larger, it is rather difficult to purify an alkoxybenzoic acid chloride and a β-hydroxycarboxylic acid, which are used for the preparation of the compound of the formula (1). Thus, the productivity is reduced, and when the compound of the formula (1) is mixed with other liquid crystals, a tendency toward a reduction of the spontaneous polarization is undesirably observed. In view of the liquid crystalline properties and the performances as an additive to a ferroelectric liquid crystal, m and n are preferably from 3 to 18 and from 1 to 10, respectively.

The compound represented by the formula (1) can be synthesized from an optionally active β-hydroxycarboxylic acid.

(A) Synthesis of an optically active β-hydroxycarboxylic acid

The optically active β-hydroxycarboxylic acid is prepared by asymmetrically reducing a β-ketocarboxylic acid or an alkyl β-ketocarboxylate by using a baker's yeast as expressed by the following formulae:

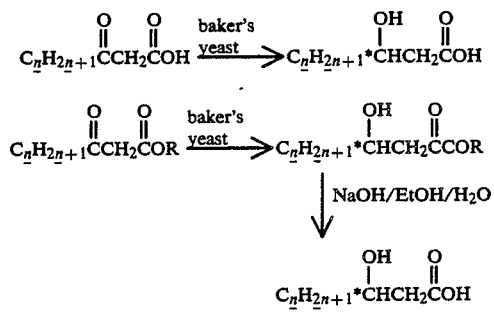

Rectus(R) modification of β-hydroxycarboxylic acid is prepared by culturing a strain capable of producing poly-β-hydroxybutyric acid (hereinafter referred to as "PHB") which belongs to the genera Pseudomonas, Alcaligenes, and Azotobacter, extracting PHB from the cultured product, and hydrolyzing the extracted PHB.

Where n is small, for example, an integer of 1 or 2, a long chain alkyl ester (the alkyl group having, for example, 8 or 10 carbon atoms) of a β-ketocarboxylic acid is preferably used as the alkyl β-ketocarboxylate instead of the above-mentioned ethyl β-ketocarboxylate because the long chain alkyl ester results in a β-hydroxycarboxylic acid having a high optical purity.

(B) Synthesis of the compound represented by the formula (1)

(i) Compound where Y is

and Z is a direct bond is prepared by the following routes.

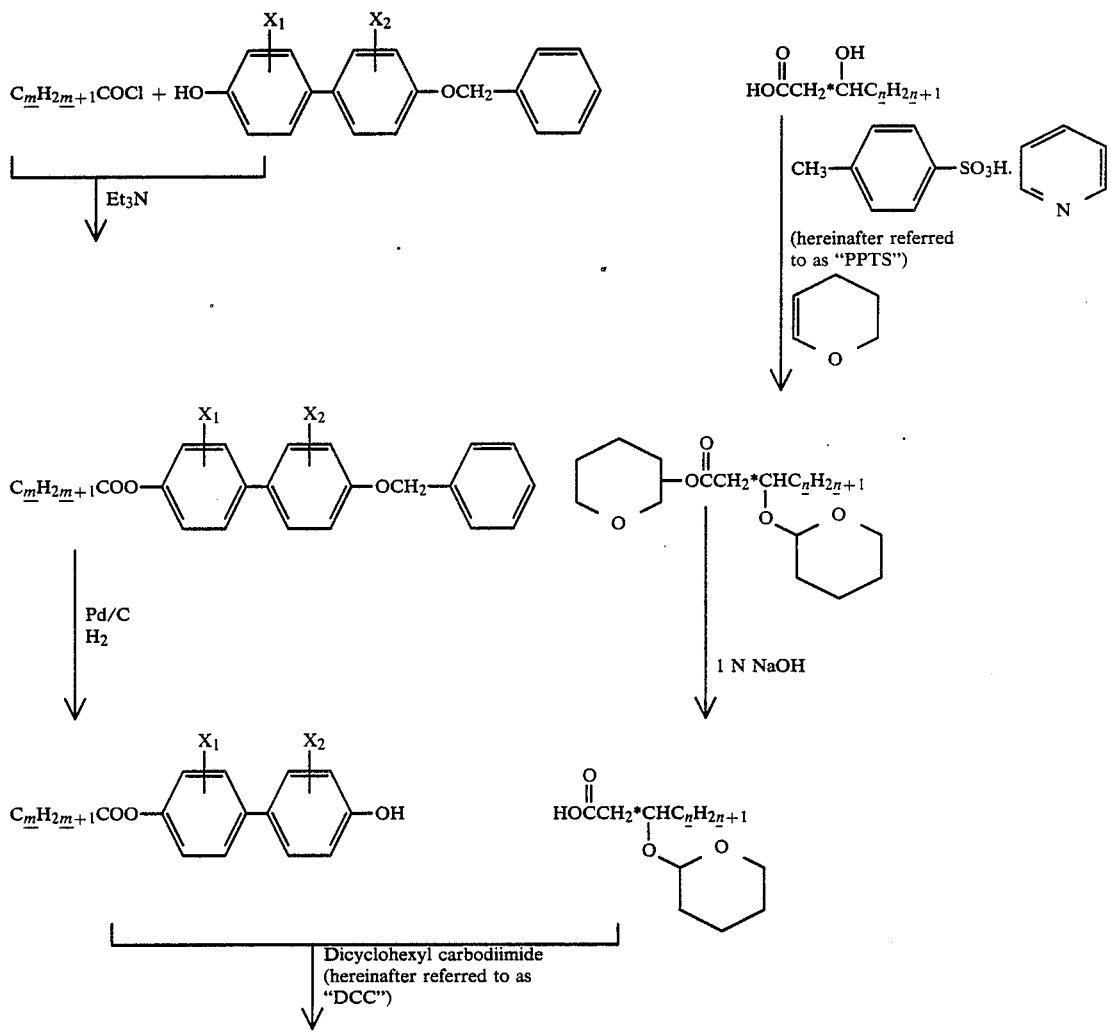

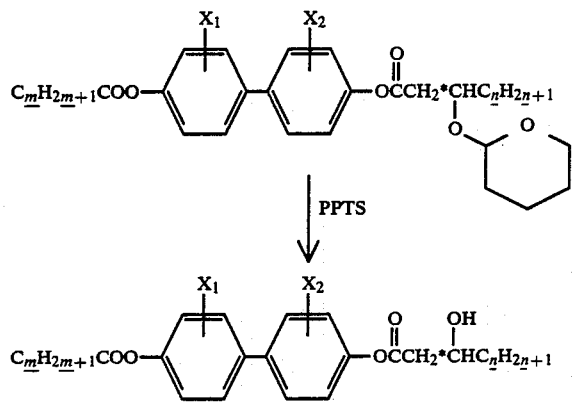
↓ PPTS
(ii) Compound where Y is  and Z is 
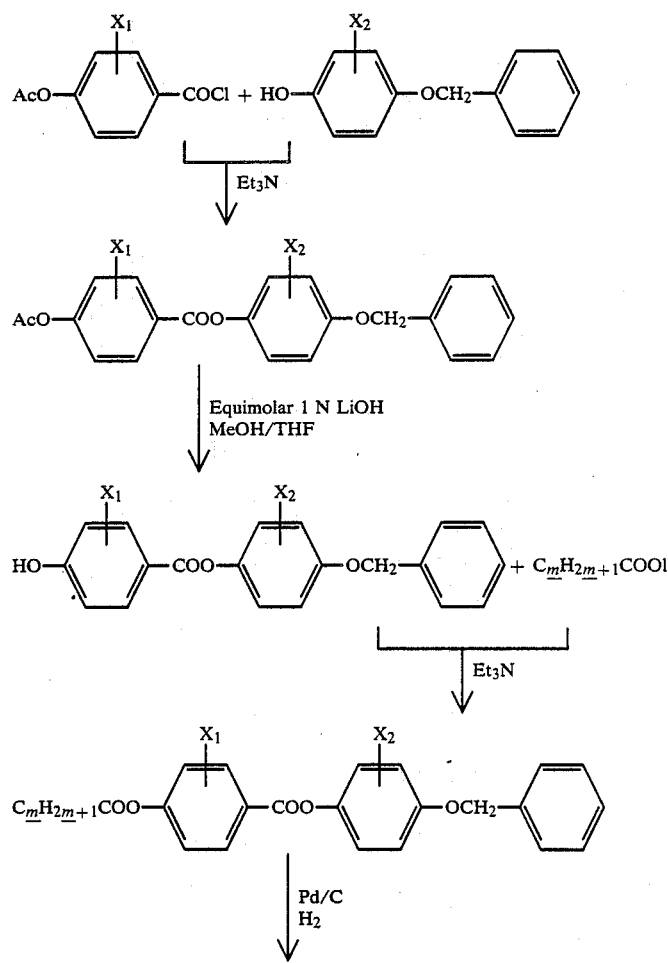

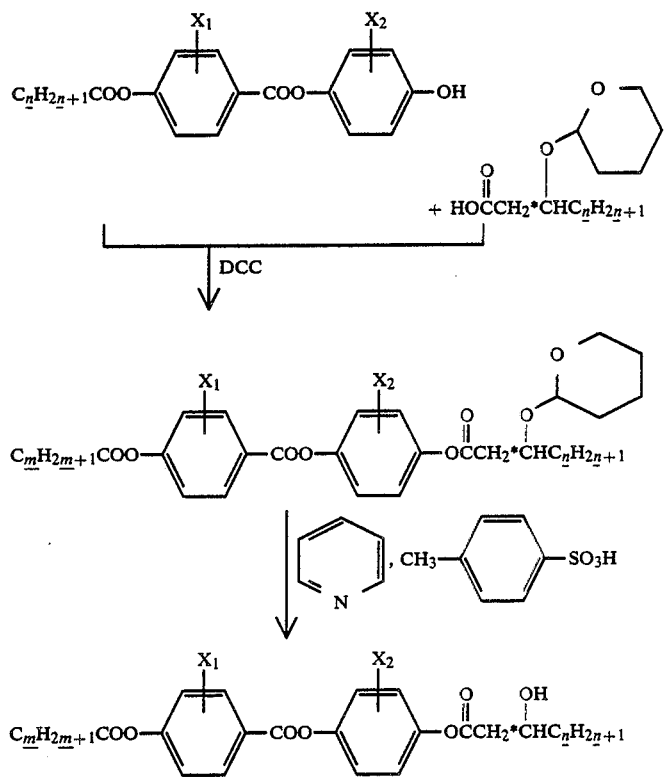
(iii) Compound where Y is  and Z is 
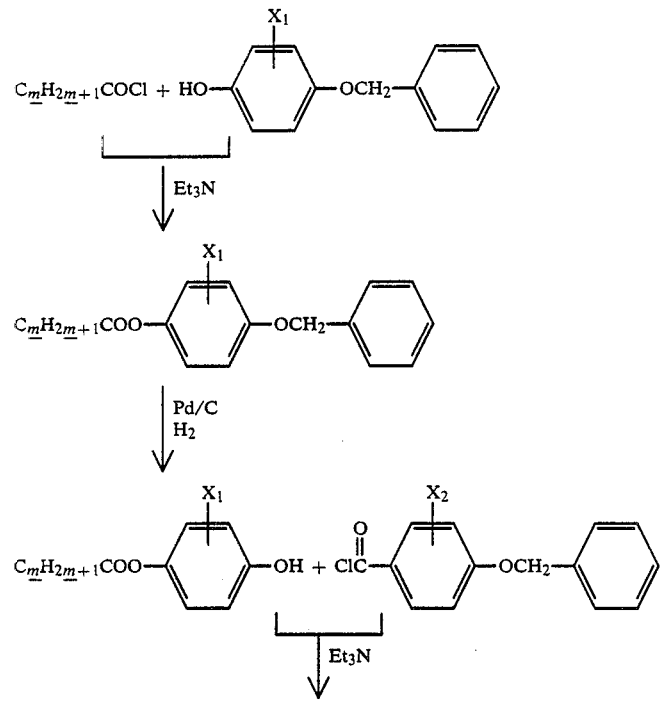

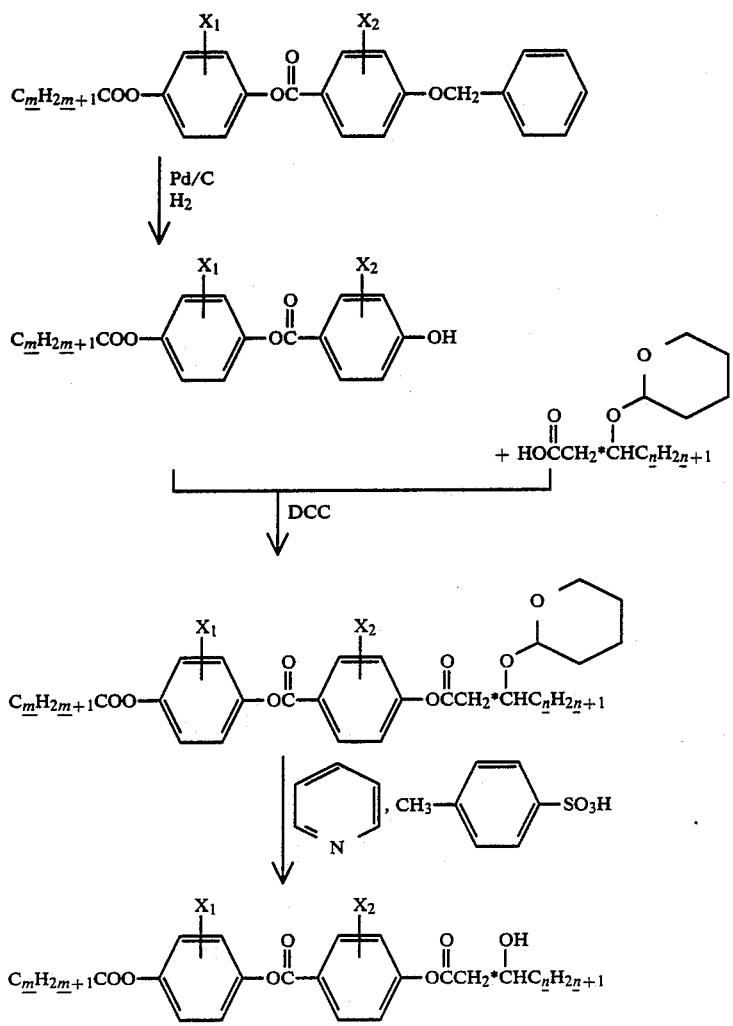
(iv) Compound where Y is $-\overset{O}{\underset{\|}{C}}O-$ and Z is $-CH_2O-$
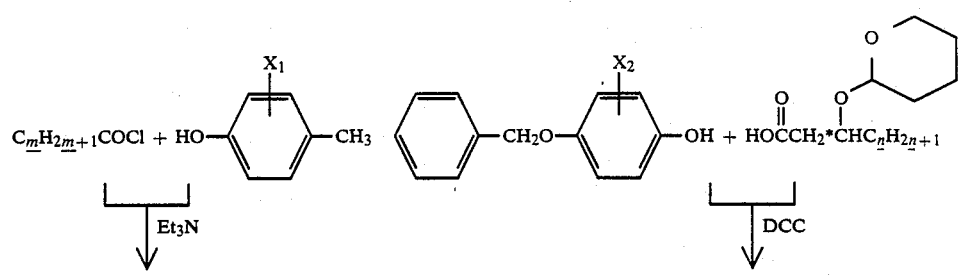

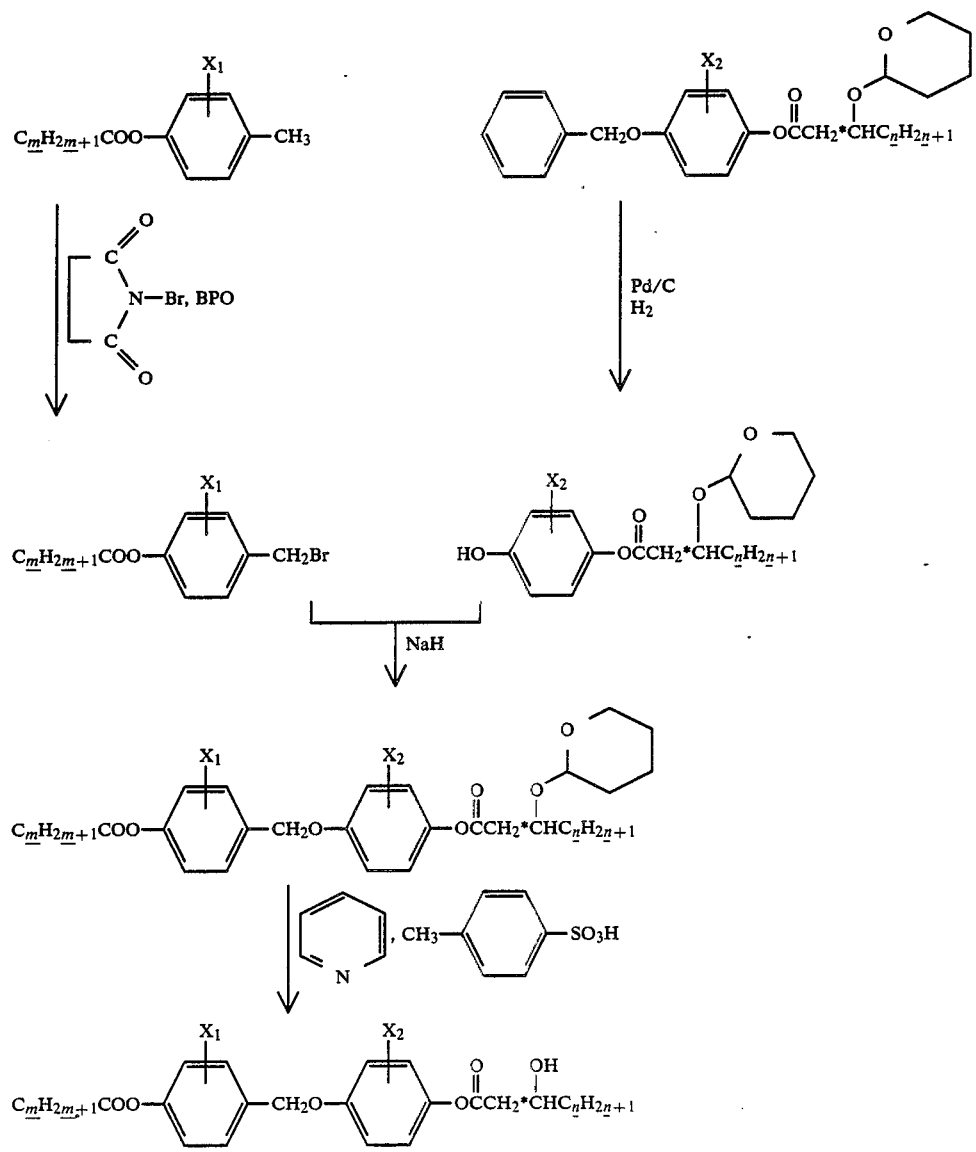
(v) Compound where Y is $-\overset{O}{\underset{\|}{C}}O-$ and Z is $-OCH_2-$
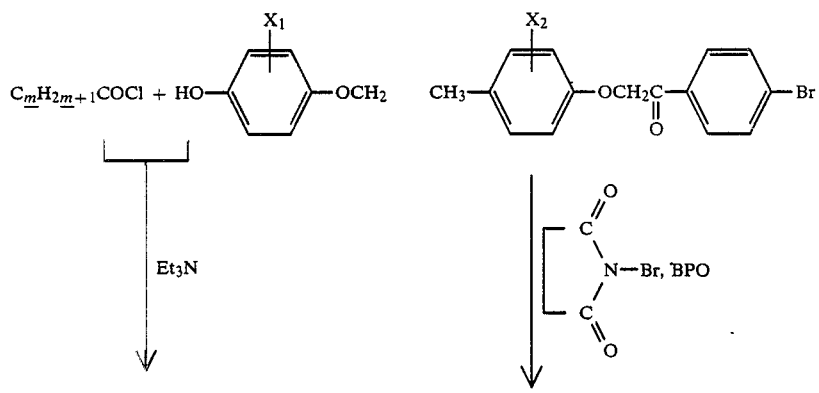

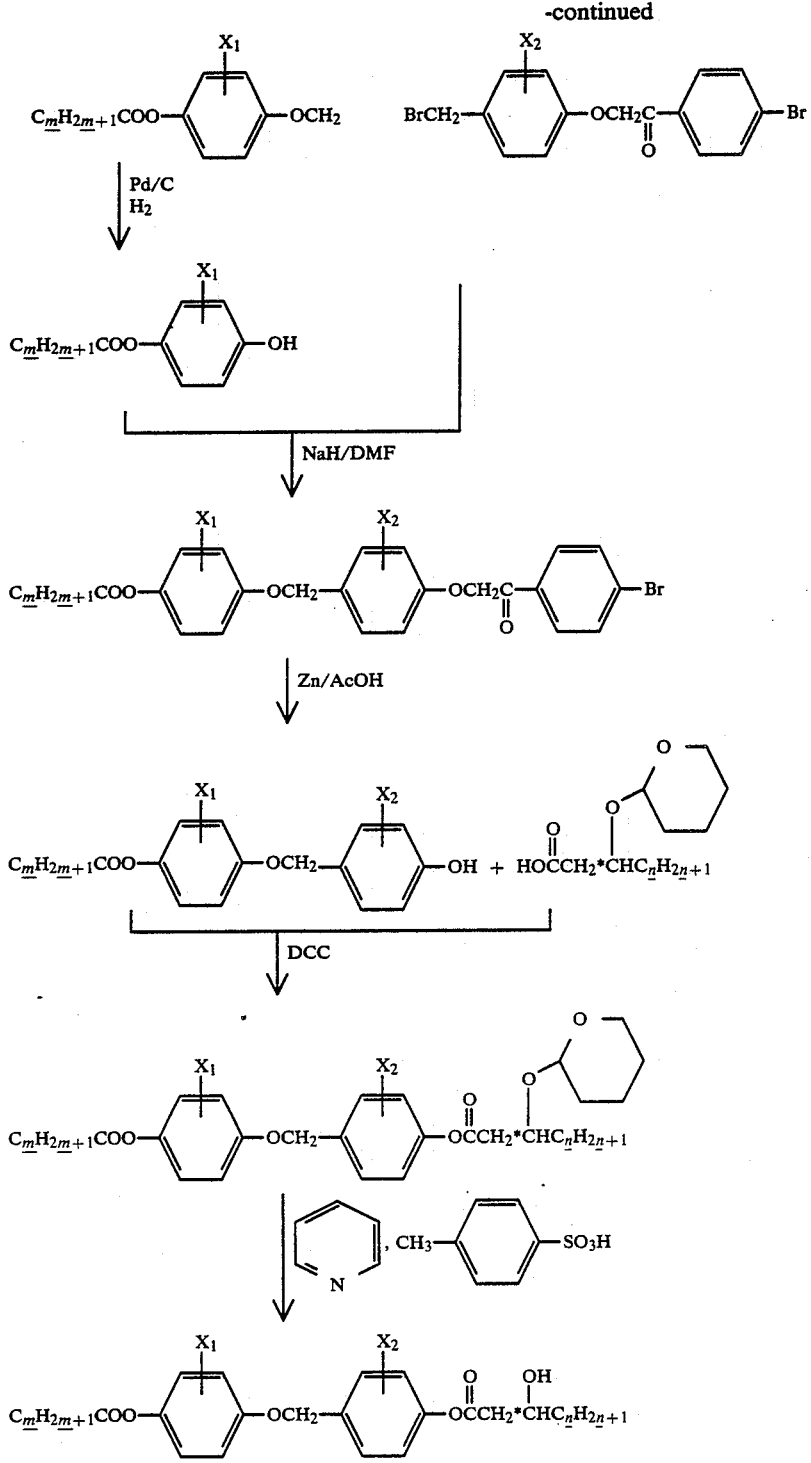
(vi) Compound where Y is
$$-O\overset{O}{\underset{\|}{C}}-$$
and Z is a direct bond
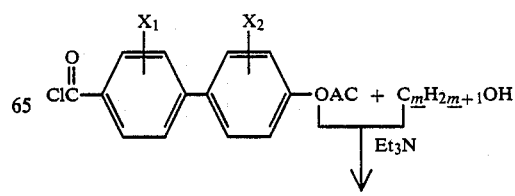

15
-continued
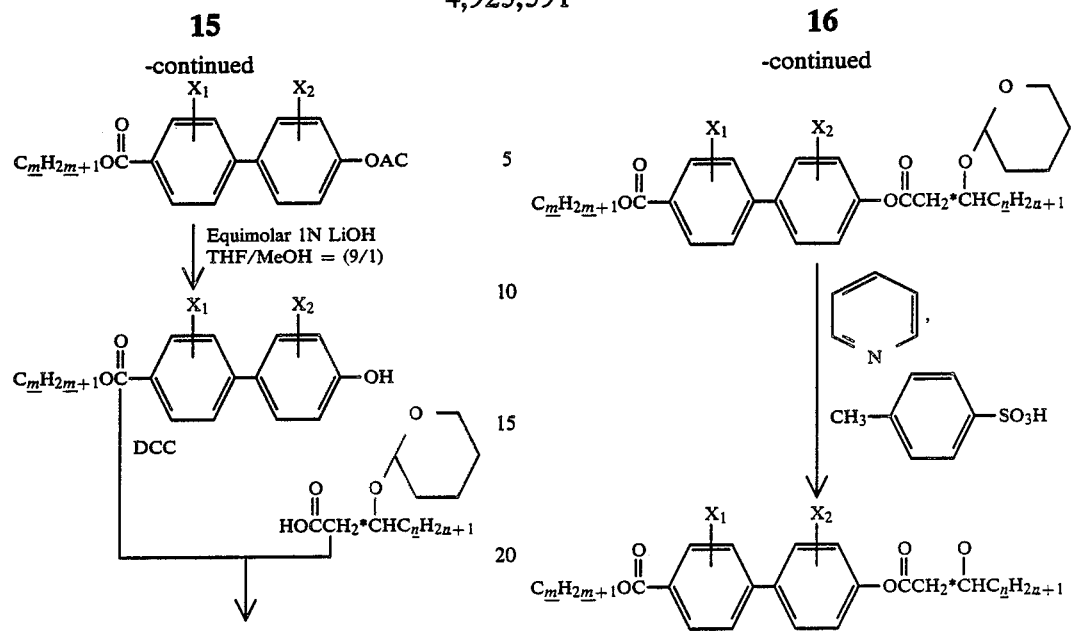
16
-continued
(vii) Compound where Y is
$$-O\overset{O}{\underset{\|}{C}}-$$
and Z is
$$-\overset{O}{\underset{\|}{C}}O-$$
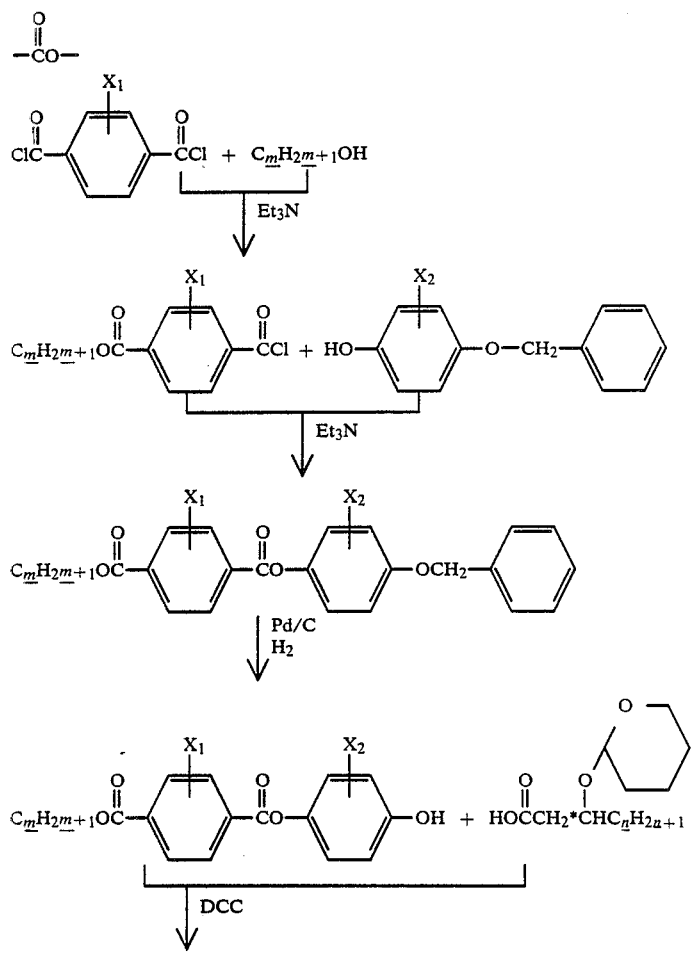

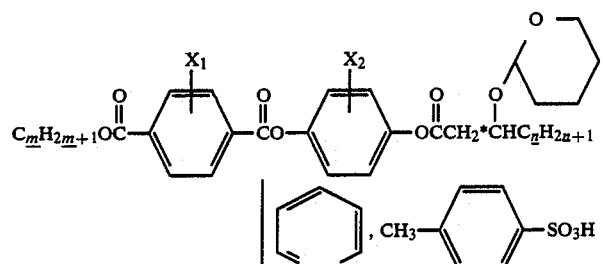
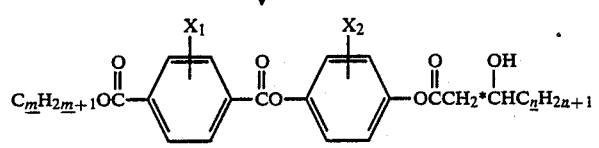
(viii) Compound where Y is 
and Z is
$$-O\overset{O}{\underset{\|}{C}}-$$
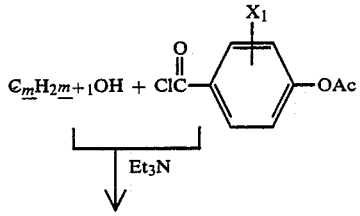
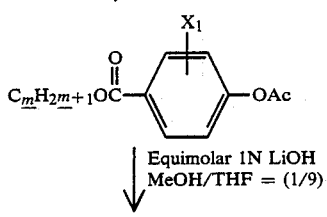
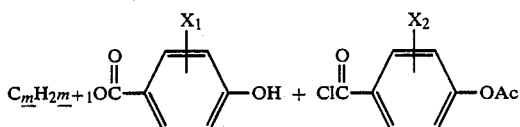
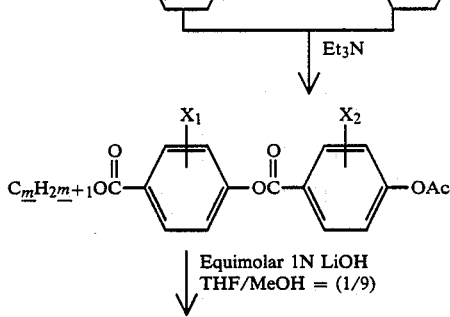

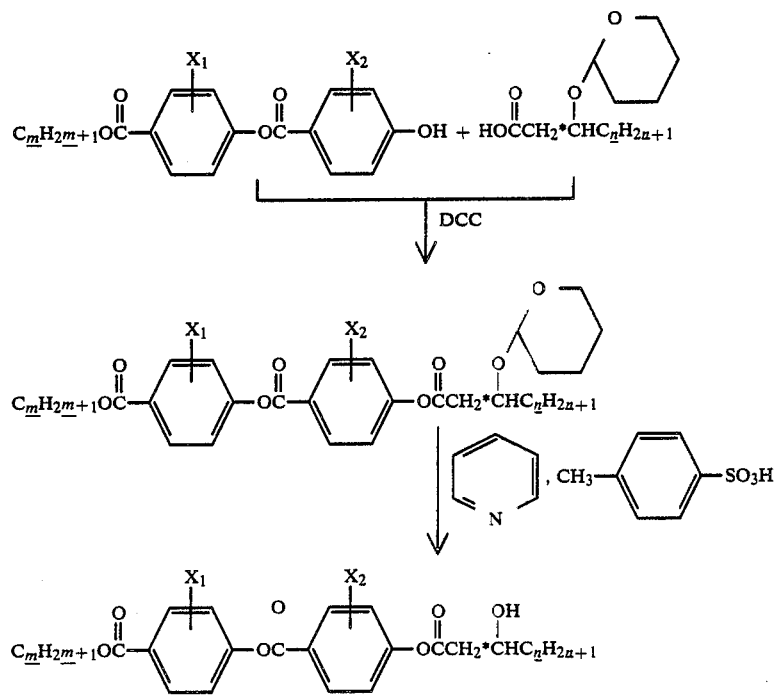
(ix) Compound where Y is
$-O\overset{O}{\underset{\|}{C}}-$
and Z is $-CH_2O-$ $C_mH_{2m+1}OH+$
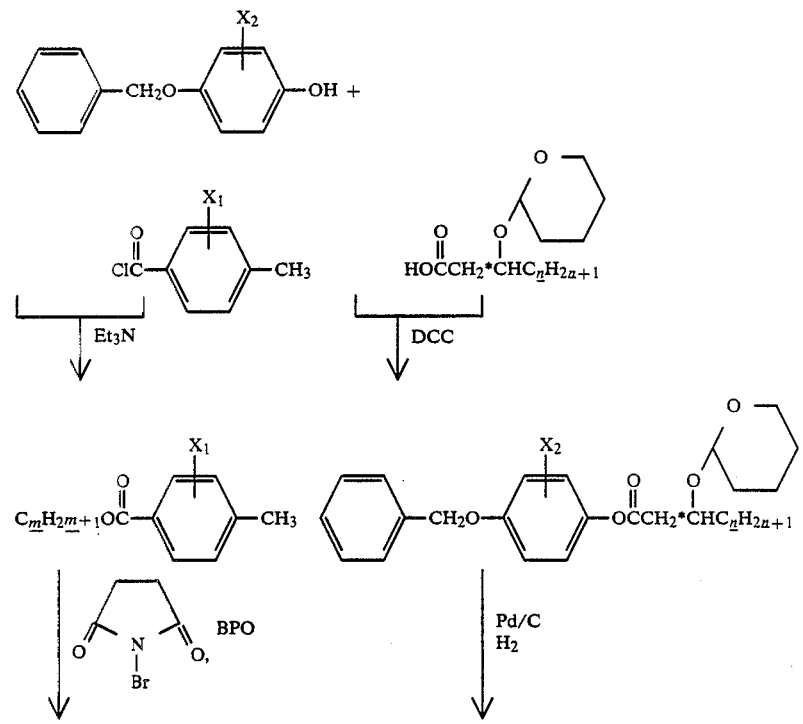

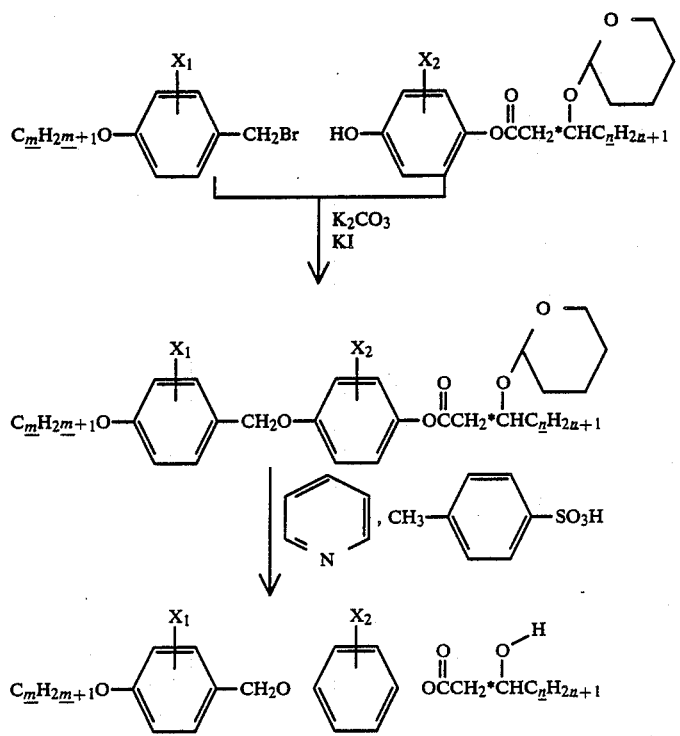
(x) Compound where Y is 
and Z is —OCH$_2$—
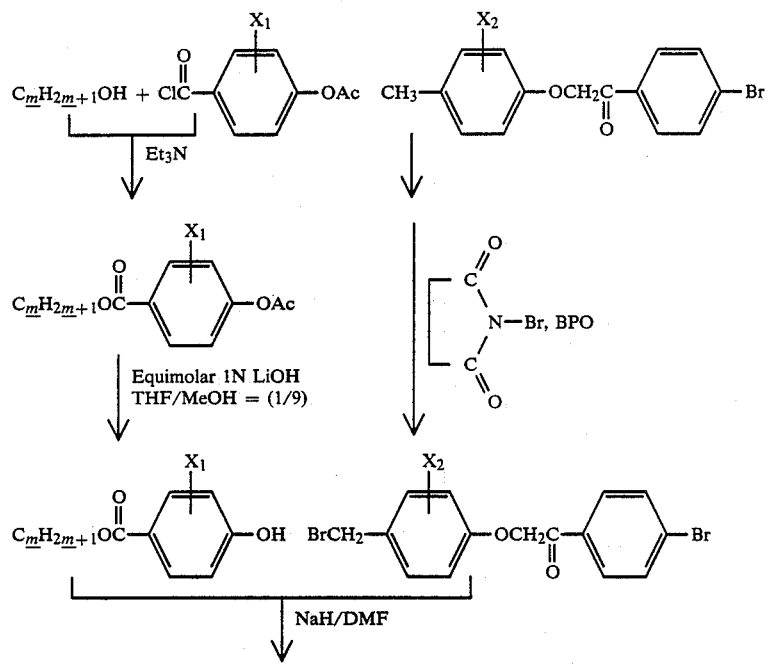

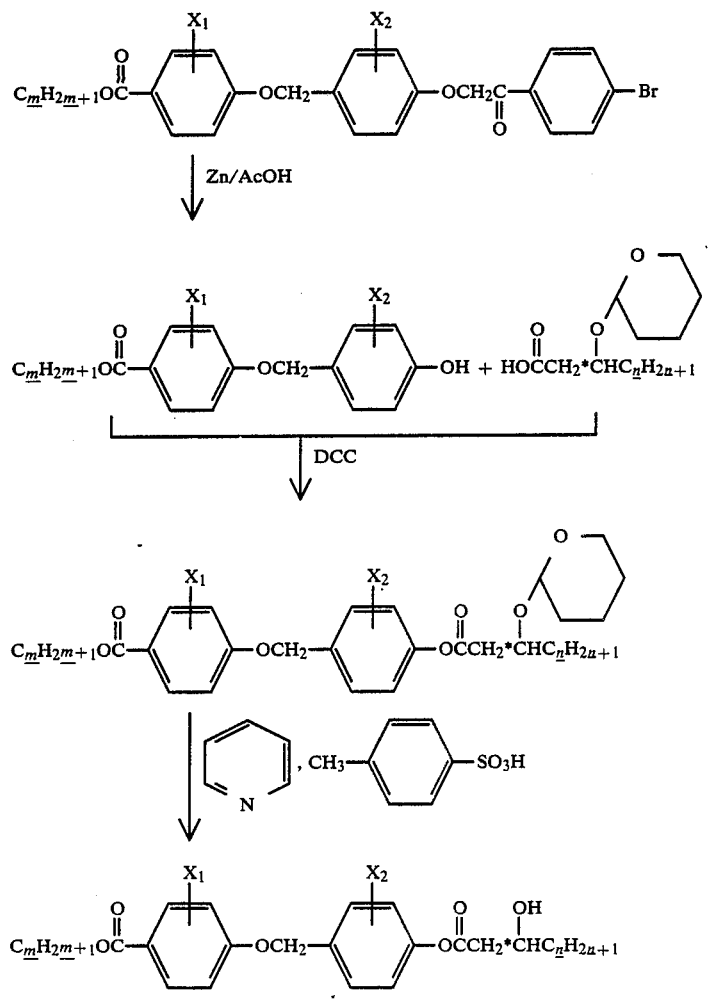
(xi) Compound where Y is —O— and Z is a direct bond
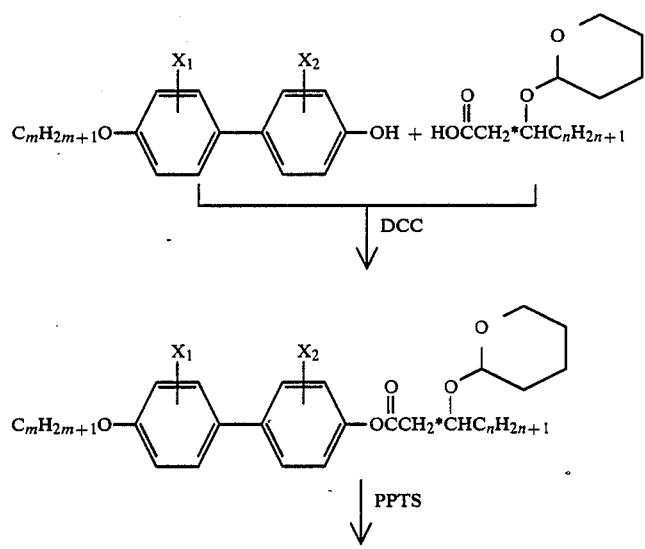

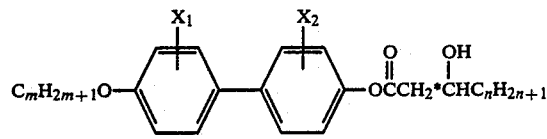
(xii) Compound where Y is —O— and Z is
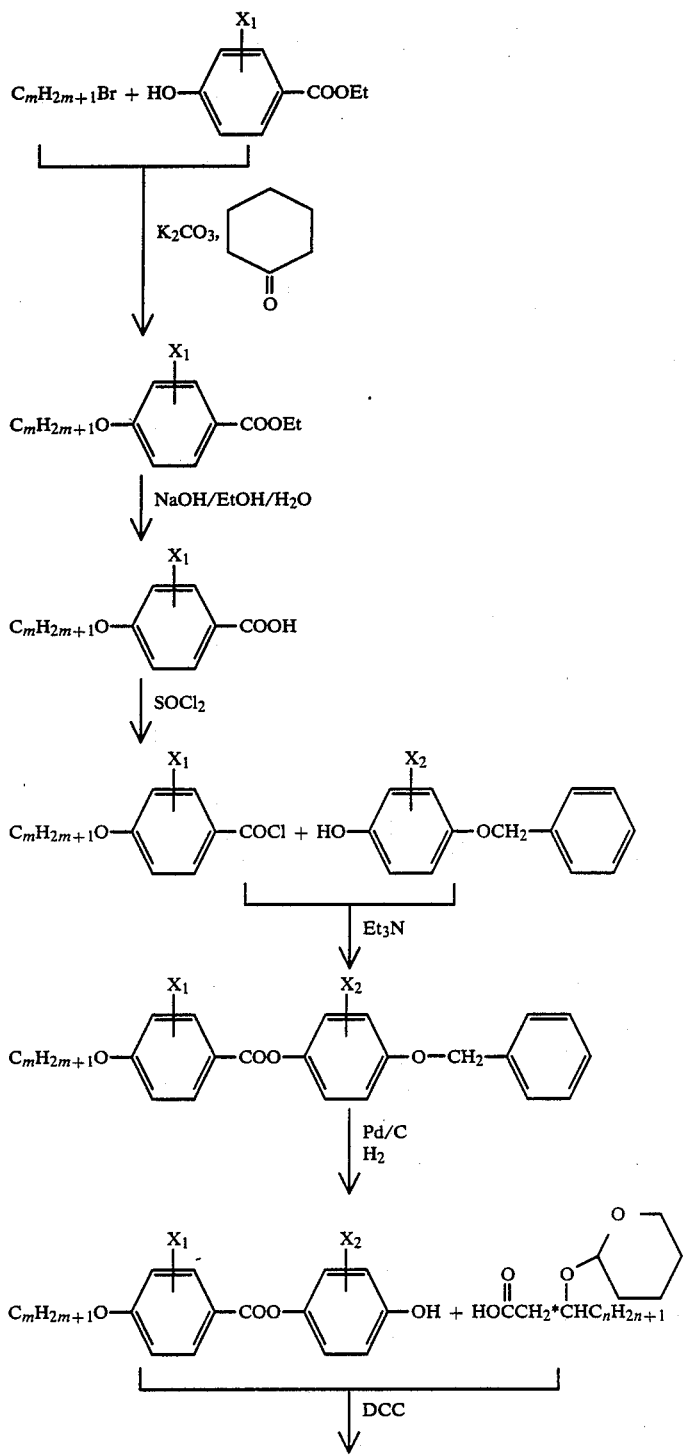

-continued
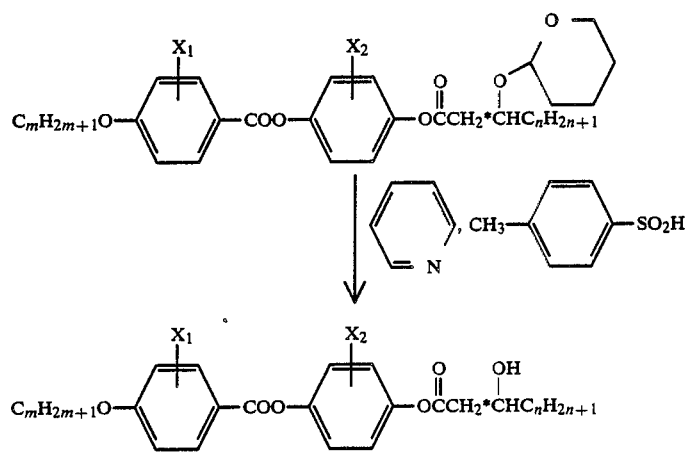
(xiii) Compound where Y is —O— and Z is
$$-O\overset{O}{\underset{\|}{C}}-$$
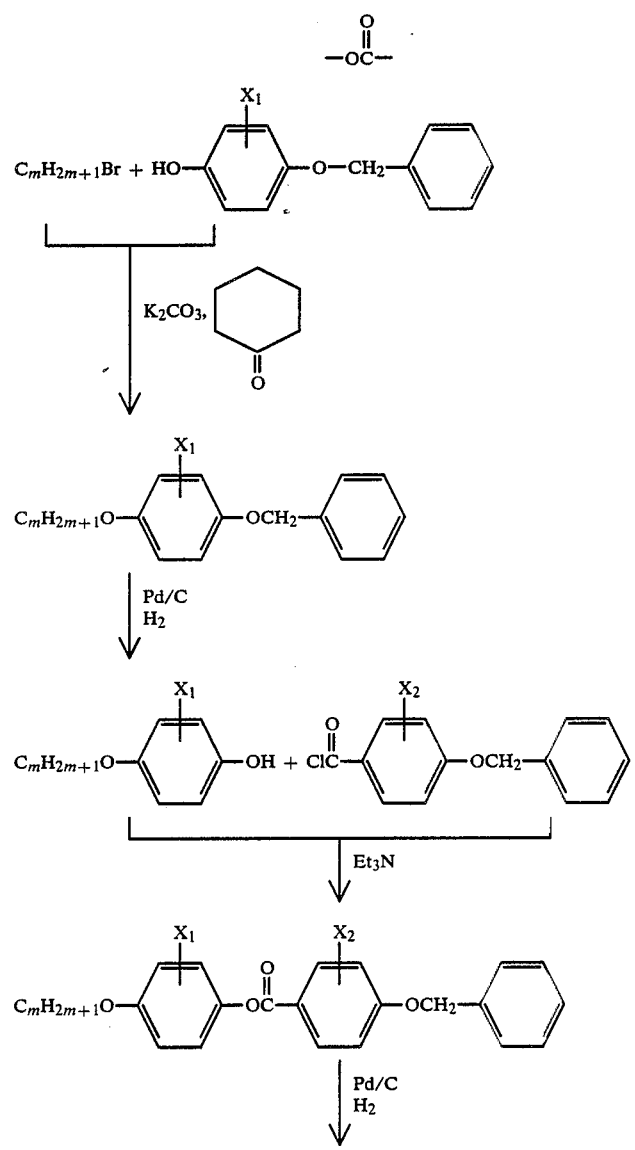

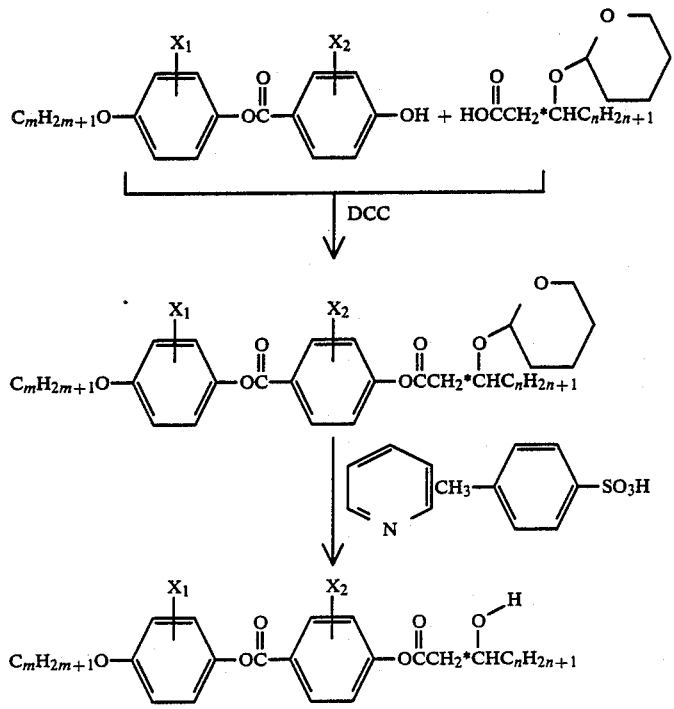
(xiv) Compound where Y is —O— and Z is —CH$_2$O—
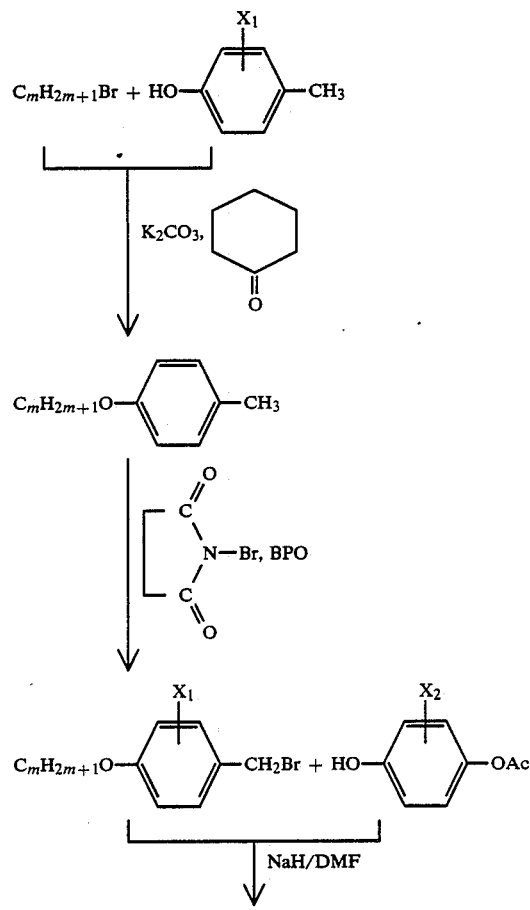

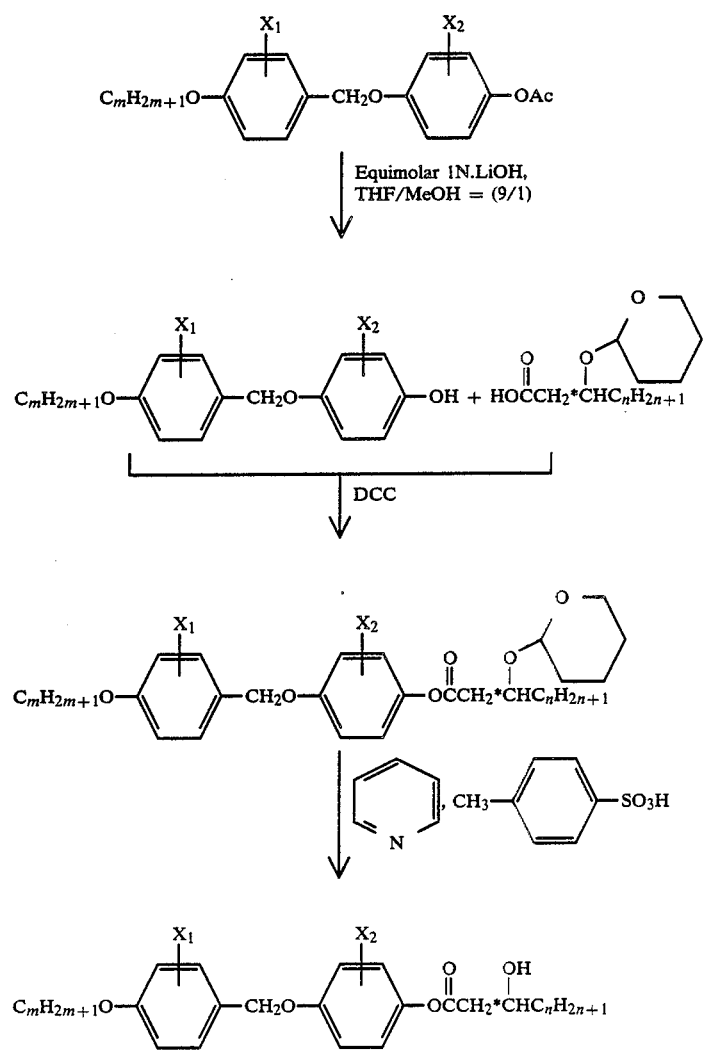
(xv) Compound where Y is —O— and Z is
—OCH$_2$— 50
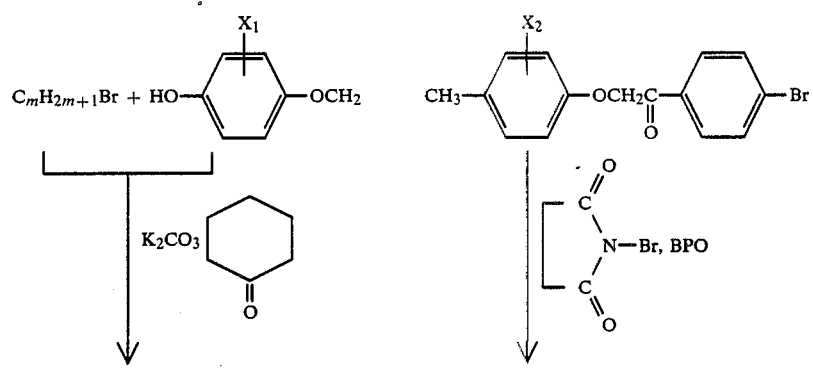

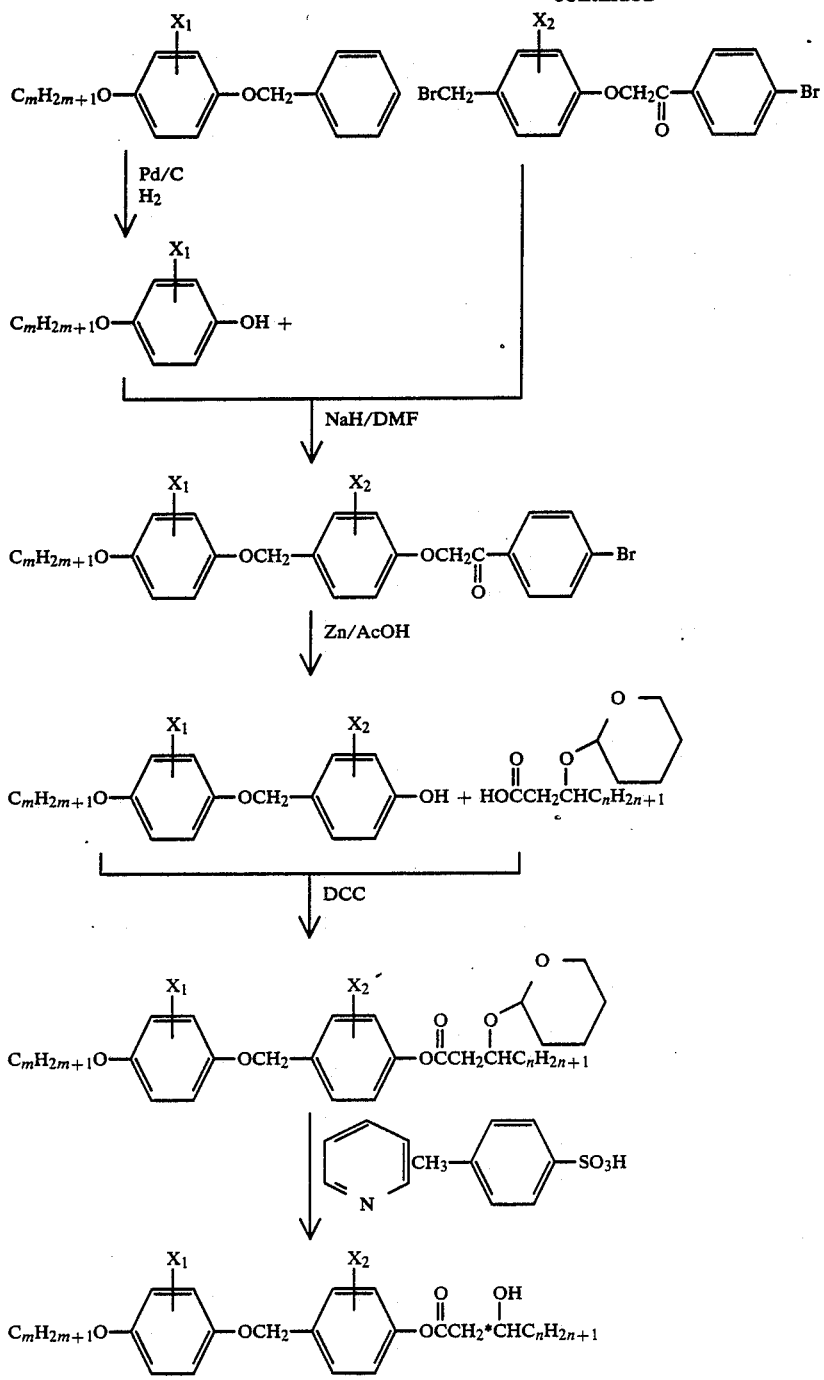

In the examples hereinafter explained, chlorine and hydrogen and used as $X_1$ and $X_2$ in the formula (1). However, compounds where fluorine is used instead of chlorine as $X_1$ or $X_2$ in the formula (1) exhibit ferroelectricity of a level similar to the compounds where chlorine is used as $X_1$ or $X_2$. But, the temperature range in which the fluorine-containing compounds exhibit the Sm*C phase is generally shifted to some extent to the high temperature side as compared with the chlorine-containing compounds.

The compounds of the present invention is characterized as possessing a structure represented by the following formula:

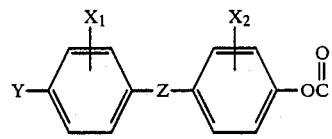

which gives a broad $\pi$ electron distribution, and an optically active group which is adjacent to the above structure and exhibits the Sm*C phase. The alkyl group connected to the group Y in the formula (1) and the alkyl group connected to the asymmetric carbon atom in the formula (1) should have the specified range of carbon atoms for rendering the Sm*C phase stable. Namely, m and n must be in the range of from 1 to 18.

A part of the compounds included within the scope of the present invention show the Sm*C phase in the practical temperature range and exhibits a very large spontaneous polarization of scores of nC/cm², and therefore, they are practically valuable.

The other part of the compounds included within the scope of the present invention do not show the Sm*C phase and are characterized in that when they are mixed with other liquid crystal materials showing the SmC phase or ferroelectric liquid crystal materials, the Sm*C phase-showing temperature range is expanded and the spontaneous polarization is increased without substantial reduction of the ferroelectricity.

Furthermore, since the compound of the present invention does not contain an azomethine bond inherently possessed by the conventional ferroelectric liquid crystal compounds, the chemical stability characteristics such as hydrolysis resistance are improved, discoloration does not occur and the light stability is improved as compared with cinnamic acid type compounds having a vinyl group. Therefore, the compound of the present invention possesses excellent characteristics required for a display material.

The liquid crystal composition of the present invention will now be described.

The liquid crystal composition of the present invention comprises at least one compound represented by the general formula (1). A liquid crystal composition comprising a plurality of ferroelectric liquid crystal compounds, optionally with another additive compound, is superior to a liquid crystal composition comprising one liquid crystal compound alone because the applicable temperature range is broadened.

As specific examples of other ferroelectric liquid crystals that can be mixed with at least one compound represented by the general formula (1), there can be mentioned compounds having the following molecular structures:

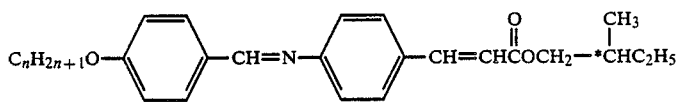

(n = integer of from 6 to 16)

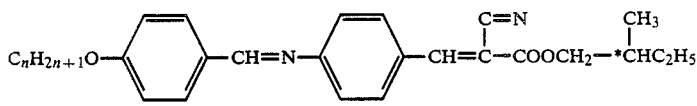

(n = integer of 8 or 10)

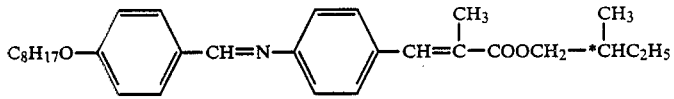

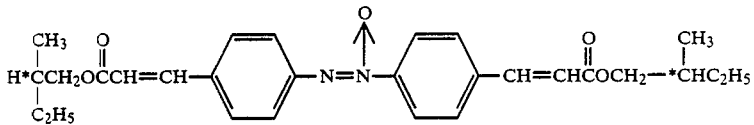

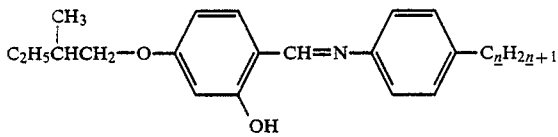

(n = integer of from 7 to 10)

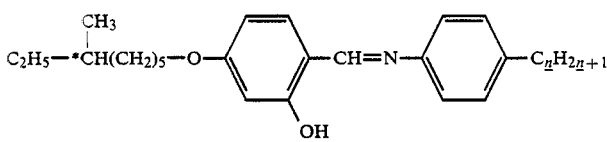

(n = integer of from 7 to 14)

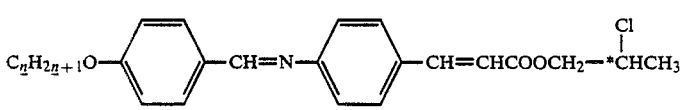

-continued
(n = integer of 6, 8 or 10)
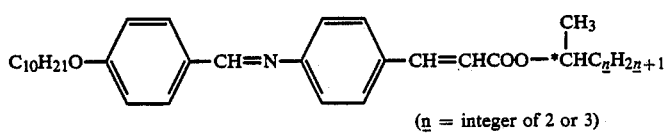
(n = integer of 2 or 3)
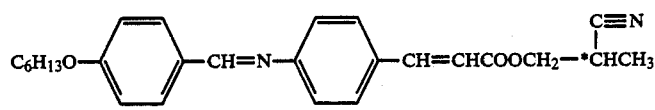
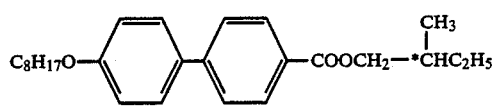
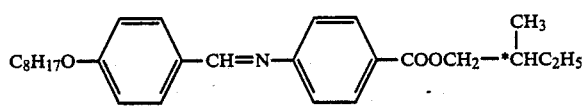
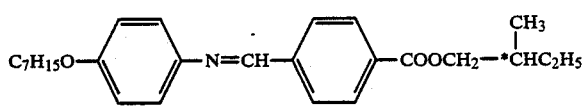
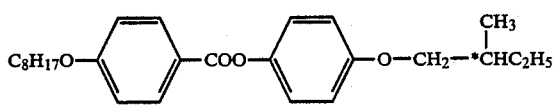
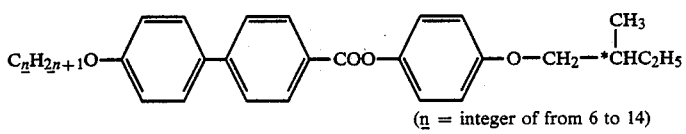
(n = integer of from 6 to 14)
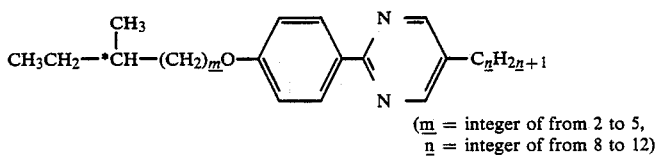
(m = integer of from 2 to 5,
n = integer of from 8 to 12)
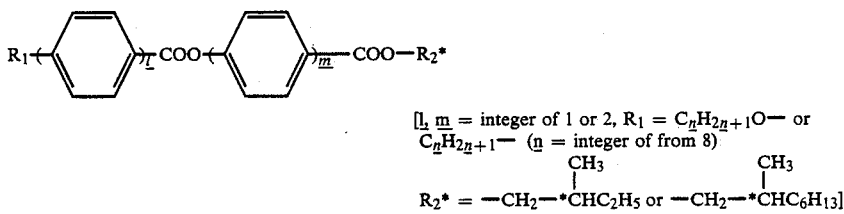
[l, m = integer of 1 or 2, R₁ = $C_nH_{2n+1}O-$ or $C_nH_{2n+1}-$ (n = integer of from 8)
R₂* = $-CH_2-{}^*CHCH_3\text{C}_2H_5$ or $-CH_2-{}^*CHCH_3\text{C}_6H_{13}$]
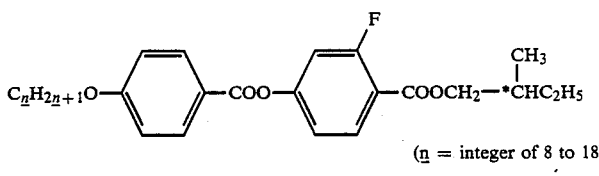
(n = integer of 8 to 18)
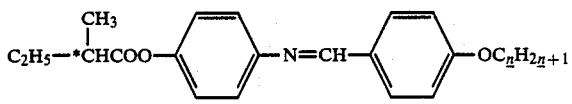

-continued (n = integer of 7 to 11)

Other liquid crystal compounds having no ferroelectric characteristics can be mixed with the compound represented by the formula (1), as long as they show the SmC phase. Furthermore, mixtures of two or more of the foregoing compounds can be mixed with the compound represented by the formula (1).

The present invention will now be described in detail with reference to the following examples.

REFERENTIAL EXAMPLE 1

Synthesis of β-hydroxynonanoic acid

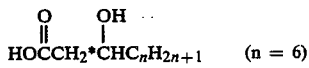
HOCCH$_2$*CHC$_n$H$_{2n+1}$    (n = 6)

A solution of 20.0 g of methyl hexyl ketone in 100 ml of dioxane was dropped into a solution comprising 210 ml of diethyl carbonate, 12.8 g of sodium hydride dispersed in oil at a concentration of 60% by weight and 100 ml of dioxane in an argon atmosphere, and the mixture was refluxed overnight. Then, the solvent was removed and the residue was distilled under a reduced pressure to obtain 20.0 g of ethyl hexylketoacetate having a boiling point of 83° C. under 0.65 mmHg. The yield was 62.5%.

In a solution comprising 75 ml of ethanol, 75 ml of distilled water and 5.02 g of potassium hydroxide was dissolved 15 g of ethyl hexylketoacetate, and the solution was stirred at room temperature for 7.5 hours, and to the solution were added 3 l of distilled water, 360 g of sucrose and 168 g of dry yeast. The mixture was shaken at 30° C. for 16 hours and filtered with Celite ™. The precipitate was air-dried and extracted with ethyl acetate, and the extract was concentrated. Separately, hydrochloric acid was added to the filtrate to adjust the pH value to 1, and sodium chloride was added to form a saturated solution. The solution was extracted with chloroform and the extract was concentrated. The thus-formed concentrate and the above-mentioned concentrate were dissolved together in diethyl ether, and the solution was extracted twice with a 1N aqueous solution of sodium hydroxide. Hydrochloric acid and sodium chloride were added to the extract again to form a saturated aqueous solution of sodium chloride having a pH value of 1. The solution was extracted 5 times with ether, and the ether layer was washed with a saturated aqueous sodium chloride solution and dehydrated on magnesium sulfate. The ether was then evaporated and the residue was recrystallized from n-hexane to obtain 7.81 g of β-hydroxynonanoic acid having a melting point of 49.3° to 50.0° C. and $[\alpha]_D^{24.5}$ of −20.1° C. (c=1.1, CHCl$_3$).

REFERENTIAL EXAMPLE 2

Synthesis of hydropyranyloxynonanoic acid

In methylene chloride were dissolved 5 g of β-hydroxynonanoic acid

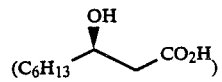

12 g of dihydropyran and 0.725 g of pyridinium p-toluenesulfonate, and the solution was stirred at room temperature for 3 hours. The thus-obtained solution was washed with an aqueous solution of NaHCO$_3$ and then with an aqueous solution of NaOH, and the liquid was dehydrated on MgSO$_4$ and concentrated to obtain 8.26 g of

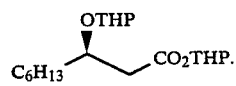

The reaction product was directly cooled to 0° C. to obtain 7.59 g of hydropyranyloxynonanoic acid.

REFERENTIAL EXAMPLE 3

Synthesis of 4-alkyloxyphenyl 4-hydroxybenzoate

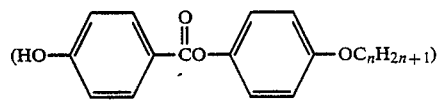

In pyridine was dissolved 2 g of p-octyloxyphenol, and a solution of p-acetoxybenzoic acid chloride in chloroform was added dropwise to the thus-obtained solution and the mixture was stirred at room temperature for 3 hours. Water was added to the thus-obtained solution and the mixture was extracted with chloroform, and the extract was washed with a 0.5N aqueous solution of hydrochloric acid, a saturated aqueous solution of sodium chloride, a saturated aqueous solution of NaHCO$_3$ and a saturated aqueous solution of sodium chloride in succession, followed by concentration. The concentrate was recrystallized from n-hexane to obtain 2.35 g of 4-octyloxyphenyl 4-acetoxybenzoate. The product was dissolved in a liquid mixture comprising tetrahydrofuran and methanol at a volume ratio of 10/1, 6.2 ml of a 1N aqueous solution of lithium hydroxide was added to the solution, the mixture was stirred at room temperature for 1 hour, and the mixture was diluted with ethyl acetate and washed with a saturated aqueous solution of sodium chloride. Then, the liquid was dehydrated on anhydrous magnesium sulfate and concentrated, and the concentrate was recrystallized from ethyl acetate to obtain 1.1 g of 4-octyloxyphenyl 4-hydroxybenzoate.

In the same manner as described above, 4-dodecyloxyphenyl 4-hydroxybenzoate was synthesized.

REFERENTIAL EXAMPLE 4

Synthesis of alkyl 4-(4-hydroxybenzoyloxy)benzoate

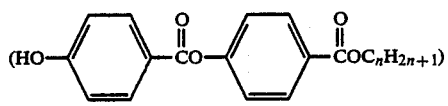

In pyridine was dissolved 5 g of dodecyl p-hydroxybenzoate, and a solution of 5 g of p-acetoxybenzoic acid chloride in chloroform was added dropwise to the solution and the mixture was stirred at room temperature for 4 hours. Water was added to the thus-obtained solution, the mixture was extracted with chloroform, and the extract was washed with a 0.5N aqueous solution of hydrochloric acid, a saturated aqueous solution of sodium chloride, a saturated aqueous solution of NaHCO₃ and a saturated aqueous solution of sodium chloride in succession, dehydrated on anhydrous magnesium sulfate and concentrated. The concentrate was recrystallized from a mixed solvent of n-hexane and ethyl acetate to obtain 3.18 g dodecyl 4-(4-acetoxybenzoyloxy)benzoate. The obtained ester was dissolved in a mixed solvent of tetrahydrofuran and methanol at a volume ratio of 10/1, 7 ml of a 1N aqueous solution of lithium hydroxide was added to the solution, and the obtained mixture was stirred at room temperature for 1 hour, diluted with ethyl acetate and washed with a saturated aqueous solution of sodium chloride. Then, the liquid was dried on anhydrous magnesium sulfate and concentrated, and the concentrate was recrystallized from a liquid mixture of n-hexane and ethyl acetate to obtain 2.22 g of dodecyl 4-(4-hydroxybenzoyloxy)benzoate.

In the same manner as described above, decyl 4-(4-hydroxybenzoyloxy)benzoate was synthesized.

REFERENTIAL EXAMPLE 5

Synthesis of hydroquinone mono(4-alkyloxycarbonyl)benzyl ether

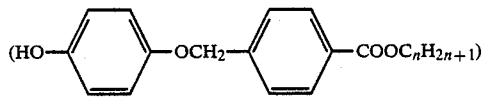

In a mixed solvent of dichloromethane and tetrahydrofuran was dissolved 5 g of p-bromomethylbenzoic acid, and 10 g of dihydropyran and 585 mg of pyridinium p-toluenesulfonate were added to the solution and the mixture was stirred at room temperature for 6 hours. The thus-obtained solution was washed with a saturated aqueous solution of NaHCO₃ and a saturated aqueous solution of sodium chloride, dried on anhydrous magnesium sulfate and concentrated. The concentrate was recrystallized from a mixed solvent of n-hexane, ethyl acetate and chloroform to obtain 3.8 g of tetrahydropyranyl p-bromomethylbenzoate.

Separately, 267.6 mg of a 60% dispersion of sodium hydride in paraffin was washed with dry pentane, dry dimethylformamide was added to the dispersion, and the inner atmosphere of the reaction vessel was substituted with nitrogen. Then, a solution of 1.1 g of p-acetoxyphenol in dimethylformamide was added dropwise to the charge in the reaction vessel, and the mixture was stirred for 2 hours. Then, a solution of 2.1 g of tetrahydropyranyl p-bromomethylbenzoate in dimethylformamide was added dropwise to the mixture, and the mixture was stirred overnight. Then, a 0.5N aqueous solution of hydrochloride was added to the thus-obtained solution, the obtained mixture was extracted with ethyl acetate, and the extract was washed with a saturated aqueous solution of sodium chloride and dried on anhydrous magnesium sulfate. The concentrate was dissolved in ethanol, and 200 mg of pyridinium p-toluenesulfonate was added to the solution and the mixture was stirred at 55° C. for 1 hour. The precipitated crystal was recovered by filtration, washed with ethanol and dried to obtain 1.0 g of 4-acetoxyphenyl(4-oxycarbonyl)benzyl ether.

To 500 mg of this 4-acetoxyphenyl-(4-oxycarbonyl)benzyl ether was added 20 ml of thionyl chloride and the mixture was refluxed for 3 hours. Then, unreacted thionyl chloride was removed. Thus, the acid chloride was quantitatively obtained. The acid chloride was dissolved in chloroform and the solution was added dropwise to a pyridine solution containing 2 ml of ice-cooled n-dodecyl alcohol, and the mixture was stirred at room temperature for 3 hours. The reaction liquid was thrown into water and extracted with ethyl acetate. The extract was washed with a 0.5N aqueous solution of hydrochloric acid, a saturated aqueous solution of NaHCO₃ and a saturated aqueous solution of sodium chloride in succession, dried on anhydrous magnesium sulfate and concentrated. The concentrate was purified by using a silica gel column to obtain 320 mg of 4-acetoxyphenyl-(4-n-dodecyloxycarbonyl)benzyl ether. The product was dissolved in a liquid mixture comprising tetrahydrofuran and methanol at a volume ratio of 9/1, 0.7 ml of 1N lithium hydroxide was added to the solution, and the mixture was stirred at room temperature for 2 hours. Then, the solution was diluted with ethyl acetate and washed with a saturated aqueous solution of sodium chloride, and was dehydrated on anhydrous magnesium sulfate and concentrated. The concentrate was recrystallized from ethyl acetate to obtain 200 mg of hydroquinone mono(4-n-dodecyloxycarbonyl)benzyl ether.

Hydroquinone mono(4-n-hexadecyloxycarbonyl)benzyl ether was synthesized in the same manner as described above.

REFERENTIAL EXAMPLE 6

Synthesis of 4-n-dodecyloxyphenyl(4'-hydroxybenzyl) ether

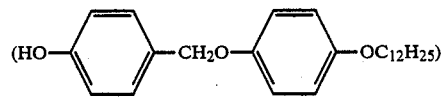

In acetone was dissolved 8.1 g of p-hydroxytoluene, and 18.8 g of p-bromo-α-bromoacetophenone and 10.4 g of potassium carbonate were added to the solution and the mixture was stirred for 3 hours. The thus-obtained solution was filtered to remove insoluble substances, the filtrate was concentrated, and the concentrate was recrystallized from ethanol to obtain 11.2 g of 4-bromo-α-4'-methylphenyloxyacetophenone. The obtained product was dissolved in tetrachloromethane, and 5.9 g of N-bromosuccinic acid imide and 330 mg of benzoyl peroxide were added to the solution and the mixture was refluxed for 3 hours. The thus-obtained solution was filtered to remove insoluble substances and the filtrate was concentrated, and the concentrate was recrystallized from a mixed solvent of n-hexane and methylene chloride to obtain 4.1 g of 4-bromo-α-4'-bromomethyl-phenyloxyacetophenone. Then, 1.5 g of this 4-bromo-α-4'-bromomethyl-phenyloxyacetophenone was dissolved in acetone, 1.2 g of p-n-dodecyloxyphenol, 0.54 g of potassium carbonate and 1 g of potassium iodide were added to the solution, and the mixture was refluxed for 2 days. Then, the thus-obtained solution was filtered to remove impurities, and the filtrate was concentrated and the intended compound was isolated by using a silica gel column. The isolated product was recrystallized from ethyl acetate to obtain 400 mg of 4-n-dodecyloxyphenyl-[4'-α-(4''-bromoacetophenone)oxybenzyl]ether. The product was dissolved in a liquid mixture comprising acetic acid and ethyl acetate, 2.1 g of powdery zinc was added to the solution, and the mixture was stirred at room temperature for 2 hours. The thus-obtained solution was filtered to remove the powdery zinc, the filtrate was concentrated, and the concentrate was diluted with ethyl acetate. The dilution was washed with a saturated aqueous solution of NaHCO₃ and then with a saturated aqueous solution of sodium chloride, and the liquid was concentrated and the concentrate was recrystallized from a liquid mixture of n-hexane and ethyl acetate to obtain 200 mg of 4-n-dodecyloxyphenyl(4'-hydroxybenzyl)ether.

REFERENTIAL EXAMPLE 7

Synthesis of 4-benzyloxy-3-chlorobenzoic acid chloride

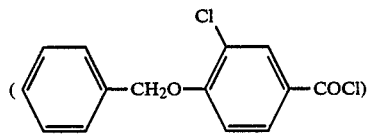

In a mixed solvent of methanol and tetrahydrofuran was dissolved 5.17 g of 4-hydroxy-3-chlorobenzoic acid, and a solution of 2.4 g of sodium hydroxide in 5 ml of water was added to the solution. Then, 10 ml of benzyl chloride was added to the mixture and the liquid was refluxed for 4 hours. Then, 1.2 g of sodium hydroxide was further added to the mixture, the liquid was refluxed for 2 hours, and the reaction liquid was put into 1N hydrochloric acid, and the precipitate was recovered by filtration, washed with water, methanol and n-pentane in succession and recrystallized from a mixed solvent of benzene and tetrahydrofuran to obtain 2.7 g of 4-benzyloxy-3-chlorobenzoic acid. Then, 15 g of thionyl chloride was added to 2.7 g of this 4-benzyloxy-3-chlorobenzoic acid, and the mixture was reacted under reflux and reacted for 3 hours. Unreacted thionyl chloride was removed by distillation under reduced pressure. Thus, 4-benzyloxy-3-chlorobenzoic acid chloride was quantitatively obtained.

REFERENTIAL EXAMPLE 8

Synthesis of n-dodecyl 4-(4-hydroxy-3-chlorobenzoyloxy)benzoate

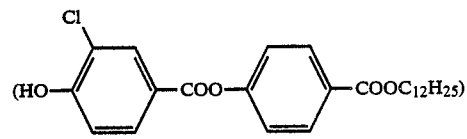

In toluene were dissolved 1.75 g of n-dodecyl p-hydroxybenzoate and 0.58 g of triethylamine, and a solution of 1.6 g of 4-benzyloxy-3-chlorobenzoic acid chloride synthesized according to the process described in Referential Example 7 in toluene was added dropwise to the solution, and the mixture was stirred and reacted at room temperature overnight. The reaction liquid was washed with a 0.5N aqueous solution of hydrochloric acid, a saturated aqueous solution of sodium chloride, a saturated aqueous solution of sodium bicarbonate and a saturated aqueous solution of sodium chloride in succession, dried on anhydrous magnesium sulfate and concentrated. The reaction product was isolated with chloroform/n-hexane by using a silica gel column. Recrystallization from ethyl acetate gave 810 mg of the purified product. The purified product was dissolved in ethyl acetate and 1 g of 5%-Pd/C was added to the solution, and the reaction was carried out at room temperature with stirring overnight in a hydrogen atmosphere. The Pd/C was removed by filtration, and the thus-obtained solution was concentrated and recrystallized from a mixed solvent of n-hexane and ethyl acetate to obtain 350 mg of the intended product.

REFERENTIAL EXAMPLE 9

Synthesis of 4-n-dodecyloxyphenyl 4-hydroxy-3-chlorobenzoate

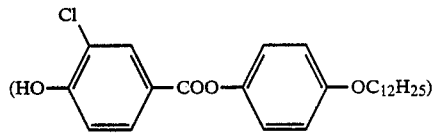

A solution of 1.6 g of 4-benzyloxy-3-chlorobenzoic acid chloride in toluene was added dropwise to a solution of 1.5 g of p-n-dodecyloxyphenol and 0.59 g of triethylamine in toluene, and the mixture was stirred at room temperature for two days and nights.

In the same manner as described in Referential Example 7, the reaction product was isolated and recrystallized from ethyl acetate to obtain 2.35 g of the purified product. The purified product was dissolved in ethyl acetate and 3 g of 5%-Pd/C was added to the solution, and reaction was carried out at room temperature overnight with stirring in a hydrogen atmosphere. Then, Pd/C was removed by filtration, and the thus-obtained solution was concentrated and recrystallized from ethyl acetate to obtain 1.21 g of the intended product.

REFERENTIAL EXAMPLE 10

Synthesis of 4-hydroxy-3-chlorophenyl 4-n-dodecyloxybenzoate

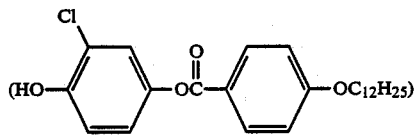

After 554 mg of sodium hydride was washed with n-pentane three times, dimethylformamide (DMF) was added to sodium hydride, the inner atmosphere of the reaction vessel was replaced by nitrogen, and the mixture was cooled to −10° C. Then, a solution of 2 g of 4-hydroxy-3-chlorophenol in DMF was added dropwise to the mixture and the liquid was stirred for 2 hours. Then, a solution of 1.1 g of chloromethoxymethane in tetrahydrofuran was added dropwise to the liquid and the mixture was stirred at room temperature overnight. The thus-obtained solution was diluted with water and extracted with ethyl acetate. The extract was washed with a saturated aqueous solution of sodium chloride, dehydrated on anhydrous magnesium sulfate and concentrated. The concentrate was developed with a mixed solvent of n-hexane and chloroform by using a silica gel column to obtain 760 mg of 4-methoxymethyloxy-3-chlorophenol. The product was dissolved in toluene, 500 mg of triethylamine was added to the solution a solution of 700 mg of p-n-dodecyloxybenzoic acid chloride in toluene was added dropwise to the above solution, and the mixture was reacted with stirring at room temperature overnight.

The thus-obtained solution was washed with a 0.5N aqueous solution of hydrochloric acid, a saturated aqueous solution of sodium chloride, a saturated aqueous solution of sodium bicarbonate and a saturated aqueous solution of sodium chloride in succession, dried on anhydrous magnesium sulfate and concentrated. The concentrate was dissolved in ethanol, 30 mg of p-toluenesulfonic acid was added to the solution, and the mixture was stirred at 55° C. for 4 hours. The thus-obtained solution was diluted with ethyl acetate, and the dilution was washed with a saturated aqueous solution of sodium bicarbonate and a saturated aqueous solution of sodium chloride in succession, and dehydrated on anhydrous magnesium sulfate. The liquid was concentrated and recrystallized from n-hexane to obtain 490 mg of 4-hydroxy-3-chlorophenyl p-n-dodecyloxybenzoate.

REFERENTIAL EXAMPLE 11

Synthesis of 4-n-dodecyloxy-3-chlorophenyl(4-hydroxy-benzyl) ether

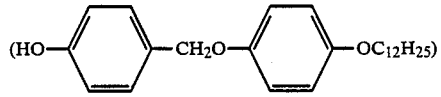

In ethanol was dissolved 5.0 g of 4-hydroxy-3-chlorophenol, and an aqueous solution of 1.38 g of sodium hydroxide and 8.6 g of n-dodecyl bromide were added to the solution under reflux in a nitrogen atmosphere. The mixture was refluxed for 6 hours and cooled, and the thus-obtained solution was put into a 1N aqueous solution of hydrochloric acid and extracted with chloroform. The extract was washed with a saturated aqueous solution of sodium chloride, dehydrated on anhydrous magnesium sulfate and concentrated. The concentrate was purified by using a silica gel column to obtain 1.73 g of 4-dodecyloxy-3-chlorophenol.

Separately, 221 mg of sodium hydride was washed with n-pentane three times, dimethylformamide (DMF) was added, and the atmosphere in the reaction system was replaced by nitrogen. Then, a solution of 1.73 g of 4-n-dodecyloxy-3-chlorophenol in DMF was added dropwise to the mixture and the liquid was stirred for 2 hours. Then, a solution of 2.12 g of p-bromomethylphenyl(p-bromophenacyl) ether in DMF was added dropwise to the mixture and the liquid was stirred overnight. The thus-obtained solution was put into a 1N aqueous solution of hydrochloric acid and extracted with ethyl acetate, and the extract was washed with a saturated aqueous solution of sodium chloride, dried on anhydrous magnesium sulfate and concentrated.

The concentrate was purified by using a silica gel column and recrystallized from ethyl acetate to obtain 560 mg of the purified product. The purified product was dissolved in a mixed solvent of ethyl acetate and acetic acid and 3.6 g of powdery zinc was added to the solution, and the mixture was stirred at 55° C. for 2 hours. The thus-obtained solution was filtered to remove the powdery zinc and ethyl acetate was added to the filtrate, and the mixture was washed with a saturated aqueous solution of sodium bicarbonate and a saturated aqueous solution of sodium chloride in succession and dehydrated on anhydrous magnesium sulfate. Evaporation of ethyl acetate gave 220 mg of the intended product.

REFERENTIAL EXAMPLE 12

Synthesis of 4-dodecyloxy-3-chlorophenyl 4-hydroxybenzoate

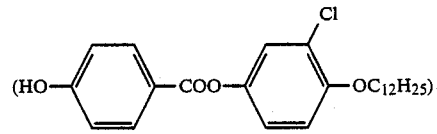

In 50 ml of tetrahydrofuran were dissolved 2.0 g of 4-dodecyloxy-3-chlorophenol prepared in the same manner as disclosed in Referential Example 11 and 1.3 g of benzoic acid chloride, 1.0 g of triethylamine was added to the solution and the mixture was stirred at room temperature overnight. The precipitate was removed by filtration and the filtrate was concentrated and purified by the silica gel column chromatography to obtain 1.9 g of 4-dodecyloxy-3-chlorophenyl p-acetoxybenzoate. This product was dissolved in a mixed solvent of tetrahydrofuran and methanol and an equimolar amount of a 1N aqueous solution of LiOH was added to the solution to selectively remove the acetyl group by hydrolysis. Then, 500 ml of ether was added to the mixture, and the ether layer was washed with 1N hydrochloric acid, a saturated aqueous solution of NaHCO$_3$ and distilled water in succession and dried on anhydrous magnesium sulfate. Ether was removed and the residue was purified by the silica gel column chromatography to obtain 1.5 g of 4-dodecyloxy-3-chlorophenyl 4-hydroxybenzoate.

REFERENTIAL EXAMPLE 13

Synthesis of 4-dodecyloxy-3-chlorophenyl 4-hydroxy-3-chlorobenzoate

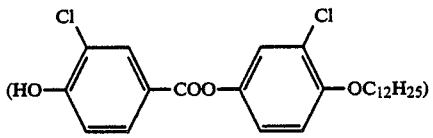

In 50 ml of tetrahydrofuran were dissolved 2.0 g of 4-dodecyloxy-3-chlorophenol synthesized in the same manner as described in Referential Example 11 and 2.0 g of 4-benzyloxy-3-chlorobenzoic acid chloride synthesized in the same manner as described in Referential Example 8, and 1.0 g of triethylamine was added to the solution, to obtain 2.0 g of 4-dodecyloxy-3-chlorophenyl 4-benzyloxy-3-benzoate in the same manner as described in Example 13. Then, the so-obtained compound was dissolved in tetrahydrofuran, Pd/C was added to the solution, and catalytic reduction was carried out under a hydrogen pressure of 1 kg/cm² to obtain 1.5 g of 4-dodecyloxy-3-chlorophenyl 4-hydroxy-3-chlorobenzoate.

REFERENTIAL EXAMPLE 14

Synthesis of 4-hydroxyphenyl 4-dodecyloxy benzoate

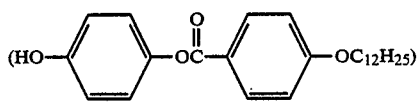

In the same manner as described in Referential Example 13, 3.0 g of p-dodecyloxybenzoic acid chloride and 2.0 g of p-benzyloxyphenol were dissolved in 50 ml of tetrahydrofuran, 1.5 g of triethylamine was added to the solution, and reaction was carried out at room temperature overnight. The obtained 4-benzyloxyphenyl 4-dodecyloxybenzoate was isolated, and reduction was carried out under a hydrogen pressure of 25 kg/cm² by using Pd/C as the catalyst to obtain 2.3 g of 4-hydroxyphenyl 4-dodecyloxybenzoate.

REFERENTIAL EXAMPLE 15

Synthesis of 4-hydroxyphenyl 4-dodecyloxy-2-chlorobenzoate

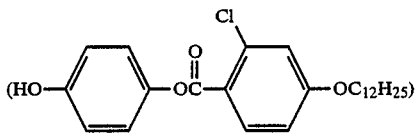

In a solution of 10 ml of concentrated sulfuric acid in 30 ml of water was dissolved 10 g of 4-amino-2-chlorobenzoic acid, the solution was reacted under reflux for 1 hour, and the thus obtained solution was cooled to 5° C. Then, 4.6 g of sodium nitrite and 20 ml of water were added to the solution and the mixture was refluxed for 5 hours and cooled. The precipitated crystal was recovered by filtration and washed with water to obtain 6.0 g of 4-hydroxy-2-chlorobenzoic acid. Then, 3 g of this 4-hydroxy-2-chlorobenzoic acid was dissolved in an aqueous solution of sodium hydroxide, 10 g of n-dodecyl bromide was added to the solution, and reaction was carried out at 80° C. for 5 hours with stirring. The thus-obtained solution was put in ice-cooled hydrochloric acid. Precipitated 4-dodecyloxy-2-chlorobenzoic acid was recovered by filtration, washed with water, dried and dissolved in dichloromethane. Then, 2.0 g of p-benzyloxyphenol and 2.0 g of dicyclohexylcarbodi-imide were added to the solution, and reaction was carried out at room temperature with stirring overnight. The precipitate was recovered from the thus-obtained solution by filtration, concentrated and purified by the silica gel column chromatography to obtain 2.3 g of 4-benzyloxyphenyl 4-dodecyloxy-2-chlorobenzoate. This product was catalytically reduced in the presence of Pd/C as the catalyst under a hydrogen pressure of 1 kg/cm² according to customary procedures to obtain 2.0 g of 4-hydroxyphenyl 4-dodecyloxy-2-chlorobenzoate.

REFERENTIAL EXAMPLE 16

Synthesis of 4-hydroxyphenyl 4-dodecyloxy-3-chlorobenzoate

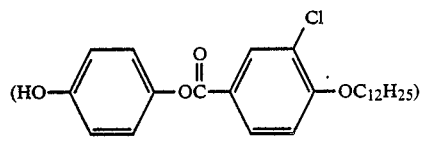

In the same manner as described in Referential Example 15, 4-hydroxy-3-chlorobenzoic acid was reacted with n-dodecyl bromide in an aqueous solution of sodium hydroxide to obtain 4-dodecyloxy-3-chlorobenzoic acid. Then, thionyl chloride was added to 2 g of the so-obtained compound, reaction was carried out under reflux for 3 hours, and unreacted thionyl chloride was removed by distillation, whereby 4-dodecyloxy-3-chlorobenzoic acid chloride was quantitatively obtained. The so-obtained compound was diluted with 50 ml of tetrahydrofuran, and 1.7 g of p-benzyloxyphenol and 1.0 g of triethylamine were added to the dilution and reaction was carried out at room temperature with stirring overnight. Precipitated triethylamine hydrochloride was removed by filtration, and the filtrate was concentrated and purified by the silica gel column chromatography to obtain 2.1 g of 4-benzyloxyphenyl 4-dodecyloxy-3-chlorobenzoate. The so-obtained compound was catalytically reduced under a hydrogen pressure of 1 kg/cm² in the pressure of Pd/C as the catalyst according to customary procedures to obtain 1.8 g of (4-hydroxyphenyl) 4-dodecyloxy-3-chlorobenzoate.

REFERENTIAL EXAMPLE 17

Synthesis of 4-dodecyloxybenzyl(4-hydroxyphenyl) ether

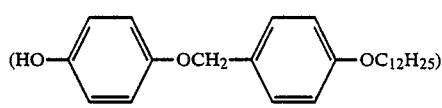

According to customary procedures, 4-dodecyloxybenzoic acid was reduced with LiAlH₄ and the formed 4-dodecyloxybenzyl alcohol was brominated with phosphorus tribromide to obtain 4-dodecyloxybenzyl bromide. Then, 2.0 g of the so-obtained compound was reacted with 1.0 g of p-acetoxyphenol in the presence of NaH in dimethylformamide to obtain 1.2 g of 4-dodecyloxybenzyl(4-acetoxyphenyl) ether. The so-obtained compounds was dissolved in a liquid mixture of tetrahydrofuran and an equimolar amount of 1N LiOH was added to the solution to remove the acetyl group, and post treatments were carried out according to customary procedures to obtain 1.0 g of 4-dodecyloxybenzyl(4-hydroxyphenyl) ether.

REFERENTIAL EXAMPLE 18

Synthesis of 4-dodecyloxybenzyl(4-hydroxy-3-chlorophenyl) ether

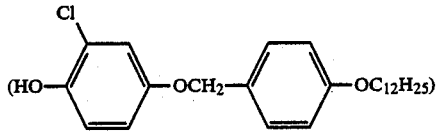

In dimethylformamide, 2 g of 4-dodecyloxybenzyl bromide synthesized in the same manner as described in Referential Example 17 was reacted with 1.5 g of 4-methoxymethyloxy-3-chlorophenol synthesized in the same manner as described in Example 11 in the presence of NaH to obtain 1.5 g of 4-dodecyloxybenzyl(4-methoxymethyloxy-3-chlorophenyl) ether. According to customary procedures, the methoxymethyl group was removed from the so-obtained compound in the presence of zinc in acetic acid to obtain 1.2 g of 4-dodecyloxybenzyl(4-hydroxy-3-chlorophenyl) ether.

REFERENTIAL EXAMPLE 19

Synthesis of 4-dodecyloxybenzyl(4-hydroxy-2-chlorophenyl)

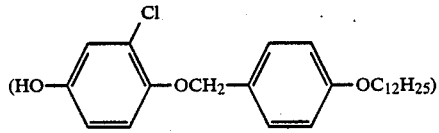

In an aqueous solution of sodium hydroxide, 2.0 g of 4-dodecyloxybenzyl bromide synthesized in the same manner as described in Referential Example 17 was reacted under reflux with 1.0 g of 4-hydroxy-3-chlorophenol for 8 hours, the thus-obtained solution was put into ice-cooled hydrochloric acid, and the precipitate was recovered by filtration, washed, dried and purified by the silica gel column chromatography to obtain 0.8 g of 4-dodecyloxybenzyl(4-hydroxy-2-chlorophenyl) ether.

REFERENTIAL EXAMPLE 20

Synthesis of 4-dodecyloxy-2-chlorobenzyl(4-hydroxyphenyl) ether

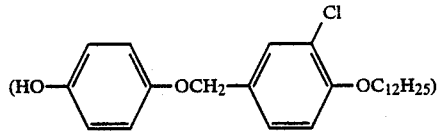

According to customary procedures, 4-dodecyloxy-2-chlorobenzoic acid synthesized in the same manner as described in Referential Example 15 was reduced with LiAlH$_4$ to obtain 4-dodecyloxy-2-chlorobenzyl alcohol, and this compound was brominated with PBr$_3$ to obtain 4-dodecyloxy-2-chlorobenzyl bromide. In the same manner as described in Referential Example 18, 2.0 g of the so-obtained compound was reacted with 1.0 g of 4-acetoxyphenol to obtain 4-dodecyloxy-2-chlorobenzyl(4-acetoxyphenyl) ether. Then, the acetyl group was removed by an equimolar amount of LiOH, whereby 0.9 g of 4-dodecyloxy-2-chlorobenzyl(4-hydroxyphenyl) ether was obtained.

EXAMPLE 1

In methylene chloride were dissolved 126 mg of 4-n-decyloxy-4-biphenol, 100 mg of β-tetrahydropyranyloxynonanoic acid, 80 mg of dicyclohexylcarbodiimide and 8 mg of 4-pyrro-lidinopyridine, and the solution was stirred at room temperature overnight. The precipitate was removed by filtration, and the liquid was diluted with ethyl acetate, washed with a 0.5N aqueous solution of hydrochloric acid, a saturated aqueous solution of sodium chloride, a saturated aqueous solution of NaHCO$_3$ and a saturated aqueous solution of sodium chloride in succession, dehydrated on anhydrous magnesium sulfate and concentrated. The intended product was isolated by using a silica gel column and was then dissolved in ethanol. Then 5 mg of pyridinium p-toluenesulfonate was added to the solution and the mixture was stirred at 55° C. for 1 hour. The reaction liquid was diluted with ethyl acetate, washed with a saturated aqueous solution of NaHCO$_3$ and a saturated aqueous solution of sodium chloride in succession, dehydrated on magnesium sulfate and concentrated. The intended compound was isolated by using a silica gel column and recrystallized from ethyl acetate to obtain 60 mg of 4-n-decyloxy-4'-biphenyl 3-hydroxynonanoate. By the NMR spectrum analysis and elementary analysis, it was confirmed that the obtained product was the intended compound.

The NMR spectrum of the so-obtained compound is shown in FIG. 1, and the phase transition temperatures and elementary analysis values are shown below.

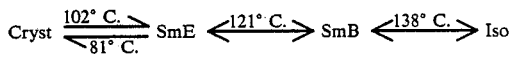

Note, Cryst indicates the crystal phase, SmE indicates the smectic E phase, SmB indicates the smectic B phase, and Iso indicates the isotropic phase. Each arrow indicates the transition to the corresponding phase and the temperature shown in the vicinity of the arrow indicates the temperature of the transition to the corresponding phase. Elementary analysis values.

|  | C (%) | H (%) |
|---|---|---|
| Theoretical values | 77.13 | 9.61 |
| Found values | 77.08 | 9.60 |

EXAMPLES 2 THROUGH 8

β-Tetrahydropyranyloxynonanoic acid synthesized in the same manner as described in Referential Example 2 and the compound synthesized in the same manner as described in any of Referential Examples 3 through 6 were dissolved in amounts shown in Table 1 in methylene chloride, and dicyclohexylcarbodi-imide and 4-pyrrolidinopyridine were added to the solution and reactions were carried out. Each reaction product was purified by using a silica gel column and pyridinium p-toluenesulfonate was added to the reaction product in ethanol to remove the tetrahydropyranyl group, whereby the intended products were obtained. The purification by the silica gel chromatography and the recrystallization were carried out in the same manner as described in Example 1. The yields and phase transition temperatures of the so-obtained compounds are shown in Table 1.

TABLE 1

| Example No. | Compounds | Charged composition (mg) Compounds of Reference Examples 3-6 | Compound of Reference Example 3 | Yield (mg) | Phase transition temperature (°C.) |
|---|---|---|---|---|---|
| 2 | $C_6H_{13}$CHCH$_2$COO–[Ph]–COO–[Ph]–OC$_8$H$_{17}$ (with OH, *) | HO–[Ph]–COO–[Ph]–OC$_8$H$_{17}$  300 | tetrahydropyran; $C_6H_{13}$*CHCH$_2$COOH  300 | 200 | Cryst $\xrightleftharpoons[80]{104}$ SmA $\xrightleftharpoons[100]{126}$ Iso; SaB |
| 3 | $C_6H_{13}$CHCH$_2$COO–[Ph]–COO–[Ph]–OC$_{12}$H$_{25}$ (with OH, *) | HO–[Ph]–COO–[Ph]–OC$_{12}$H$_{25}$  400 | tetrahydropyran; $C_6H_{13}$*CHCH$_2$COOH  400 | 250 | Cryst $\xrightleftharpoons[92]{104}$ SmA $\xrightleftharpoons[98]{123}$ Iso; SaB |
| 4 | $C_6H_{13}$CHCH$_2$COO–[Ph]–COO–[Ph]–COOC$_{10}$H$_{21}$ (with OH, *) | HO–[Ph]–COO–[Ph]–COOC$_{10}$H$_{21}$  400 | tetrahydropyran; $C_6H_{13}$*CHCH$_2$COOH  400 | 300 | Cryst $\xrightleftharpoons[61]{89}$ SmA $\xrightleftharpoons[71]{118}$ Iso; SaB |
| 5 | $C_6H_{13}$CHCH$_2$COO–[Ph]–COO–[Ph]–COOC$_{12}$H$_{25}$ (with OH, *) | HO–[Ph]–COO–[Ph]–COOC$_{12}$H$_{25}$  400 | tetrahydropyran; $C_6H_{13}$*CHCH$_2$COOH  400 | 350 | Cryst $\xrightleftharpoons[80]{94}$ SmA $\xrightleftharpoons{114}$ Iso |

TABLE 1-continued

| Example No. | Compounds of Reference Examples 3-6 | Compound of Reference Example 3 | Yield (mg) | Phase transition temperature (°C) |
|---|---|---|---|---|
| 6 | OH / C₆H₁₃CHCH₂COO—⟨benzene⟩—OCH₂—⟨benzene⟩—COOC₁₂H₂₅ + HO—⟨benzene⟩—OCH₂—⟨benzene⟩—COOC₁₂H₂₅ (200) | ⟨tetrahydropyran⟩ C₆H₁₃CHCH₂COOH (300) | 150 | Cryst ⇌(90/81) Iso →(87) SmA |
| 7 | OH / C₆H₁₃CHCH₂COO—⟨benzene⟩—OCH₂—⟨benzene⟩—COOC₁₆H₃₃ + HO—⟨benzene⟩—OCH₂—⟨benzene⟩—COOC₁₆H₃₃ (400) | ⟨tetrahydropyran⟩ C₆H₁₃CHCH₂COOH (400) | 320 | Cryst ⇌(94/86) Iso →(88) SmA |
| 8 | OH / C₆H₁₃CHCH₂COO—⟨benzene⟩—CH₂O—⟨benzene⟩—OC₁₂H₂₅ + HO—⟨benzene⟩—CH₂O—⟨benzene⟩—OC₁₂H₂₅ (200) | ⟨tetrahydropyran⟩ C₆H₁₃CHCH₂COOH (300) | 180 | Cryst ⇌(113/102) Iso →(107) SmA |

EXAMPLE 9

In a mixed solvent of methanol and tetrahydrofuran was dissolved 5.17 g of 4-hydroxy-3-chlorobenzoic acid, and a solution of 2.4 g of sodium hydroxide in 5 ml of water was added to the solution. Then, 10 ml of n-dodecyl bromide was added dropwise to the mixture and the resulting mixture was refluxed for 2 hours. Then, 1.2 g of sodium hydroxide was further added and the mixture was refluxed for 1 hour. The thus-obtained solution was put in a 1N aqueous solution of hydrochloric acid, and the precipitate was recovered and filtration, washed with water and then with n-hexane and recrystallized from ethyl acetate to obtain 4.1 g of 4-n-dodecyloxy-3-chlorobenzoic acid.

To 1.0 g of this 4-n-dodecyloxy-3-chlorobenzoic acid was added 10 g of thionyl chloride, and the mixture was refluxed for 3 hours and unreacted thionyl chloride was removed under a reduced pressure. Thus, 4-n-dodecyloxy-3-chlorobenzoic acid chloride was quantitatively obtained. A solution of the so-obtained compound in toluene was added dropwise to a solution of 0.59 g of p-benzyloxyphenol and 0.3 g of triethylamine in toluene, and the mixture was stirred overnight. The thus-obtained solution was diluted with ethyl acetate, and the dilution was washed with 0.5N hydrochloric acid, a saturated aqueous solution of sodium chloride, a saturated aqueous solution of sodium bicarbonate and a saturated aqueous solution of sodium chloride in succession, dehydrated on anhydrous sodium sulfate and concentrated under a reduced pressure to obtain p-benzyloxyphenyl 4-dodecyloxy-3-chlorobenzoate. The so-obtained ester was dissolved in ethyl acetate and 1 g of 5%-Pd/C was added to the solution, and the mixture was stirred at room temperature under a pressure of 3 atmospheres in a hydrogen atmosphere for three days and three nights. The Pd/C was removed by filtration and the filtrate was recrystallized from n-hexane to obtain 500 mg of 4-hydroxyphenyl 4-dodecyloxy-3-chlorobenzoate.

Figure 2:
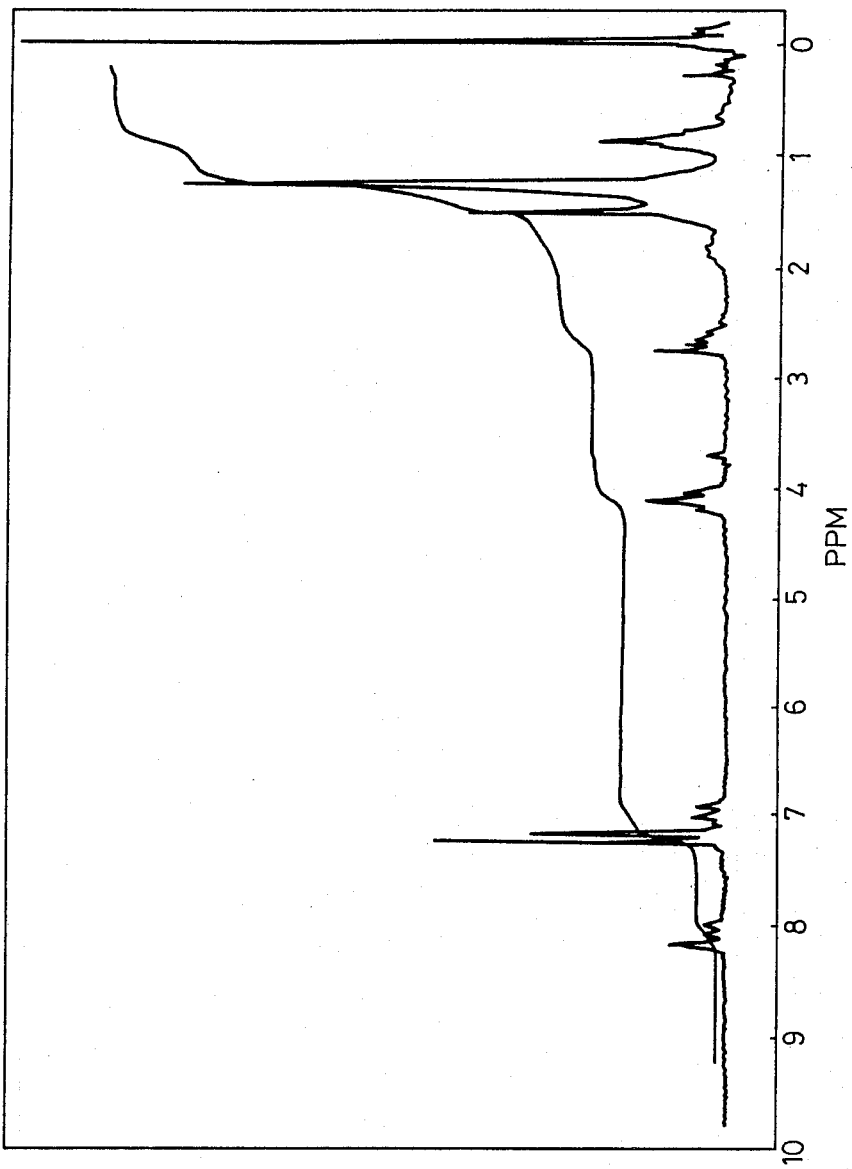

Then, 300 mg of 4-hydroxyphenyl 4-dodecyloxy-3-chlorobenzoate, 300 mg of β-tetrahydropyranyloxynonanoic acid, 250 mg of dicyclohexylcarbodi-imide and 25 mg of 4-pyrrolidinopyridine were dissolved in methylene chloride, and reaction was carried out at room temperature with stirring overnight. The thus-obtained solution was diluted with ethyl acetate, and the dilution was washed with a 0.5N aqueous solution of hydrochloric acid, a saturated aqueous solution of sodium chloride, a saturated aqueous solution of sodium bicarbonate and a saturated aqueous solution of sodium chloride in succession, dehydrated on anhydrous magnesium sulfate and concentrated. The intended product was isolated by the silica gel column chromatography using a mixed solvent of n-hexane and chloroform. The isolated product was dissolved in ethanol, 20 mg of pyridinium p-toluenesulfonate was added to the solution, and the mixture was stirred at 50° C. for 1 hour. The thus-obtained solution was diluted with ethyl acetate again, and the dilution was washed with a saturated aqueous solution of sodium bicarbonate and a saturated aqueous solution of sodium chloride in succession, dehydrated on anhydrous magnesium sulfate and concentrated. The intended product was isolated by the silica gel column chromatography using a mixed solvent of n-hexane and chloroform and recrystallized from ethyl acetate to obtain 150 mg of 4-(β-hydroxynonylcarboxy)phenyl 4-dodecyloxy-3-chlorobenzoate. By the NMR spectrum analysis and elementary analysis, it was confirmed that the obtained product was the intended compound. The NMR spectrum of the obtained compound is shown in FIG. 2, and the elementary analysis values are shown below.

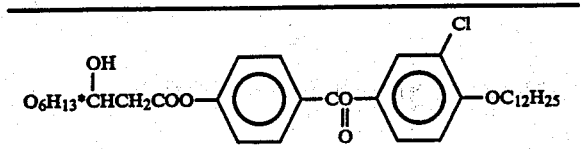

|  | Carbon (C %) | Hydrogen (H) | Oxygen (O %) |
|---|---|---|---|
| Found values | 69.50 | 8.40 | 16.15 |
| Calculated values | 69.31 | 8.38 | 16.29 |

The phase transition temperatures of the obtained compounds, as determined by a polarization microscope and a differential scanning calorimeter (DSC), are shown below.

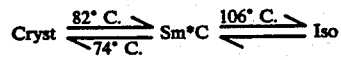

Note, Cryst, Sm*C and Iso indicate the crystal phase, the chiral smectic C phase and the isotropic liquid phase, respectively. Each arrow indicates the transition to the corresponding phase and the temperature shown in the vicinity of the arrow indicates the temperature of the transition to the corresponding phase.

Figure 3:
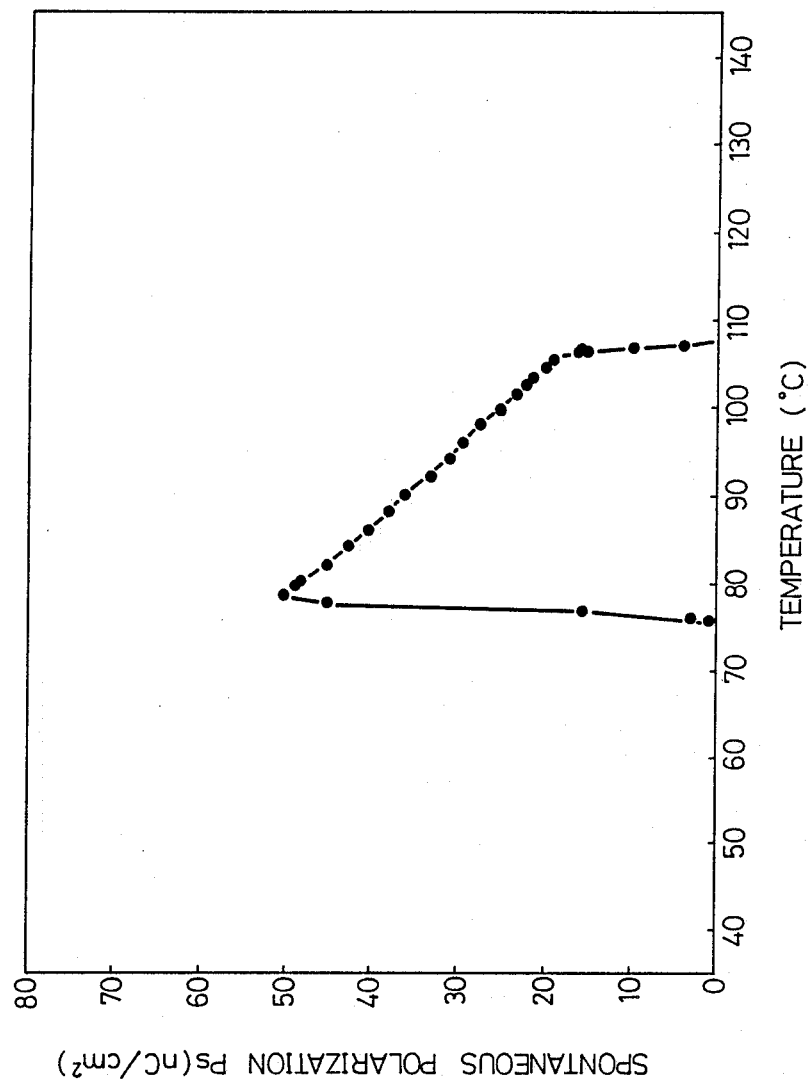
FIG. 3 shows the temperature dependency of the spontaneous polarization.

The temperature dependency of the spontaneous polarization of the compound was determined by the triangular wave method. The results are shown in FIG. 3.

EXAMPLES 10 THROUGH 22

Liquid crystal compounds comprising β-hydroxycarboxylic acid as the asymmetric phase were obtained by reacting the compound shown in Table 2, which was obtained by any of the methods described in Referential Examples 7 through 20, with β-tetrahydropyranyloxynonanoic acid synthesized in the same manner as described in Referential Example 2 at a charge ratio shown in Table 2 under the same conditions as described in Example 1.

The phase transition temperature of these compounds determined according to the method described in Example 1 are shown in Table 2.

A liquid crystal compound having a chiral smectic (Sm*C) phase, which is a ferroelectric phase, is a practically valuable compound. Of the compounds shown in these examples, even compounds having no ferroelectric phase are practically valuable because they exert an effect of inducing a chiral smectic C phase, which is a ferroelectric phase, when mixed with a smectic C liquid crystal not showing a ferroelectric characteristic.

TABLE 2

| Example No. | Compounds | Charged composition (mg) | | Yield (mg) | Phase transition temperature (°C.) |
|---|---|---|---|---|---|
| | | Compounds of Reference Example 7-20 | Compound of Reference Example 2 | | |
| 10 | C$_6$H$_{13}$*CHCH$_2$COO—(Cl)—COO—()—COOC$_{12}$H$_{25}$ (OH) | HO—(Cl)—COO—()—COOC$_{12}$H$_{25}$  350 | C$_6$H$_{13}$*CHCH$_2$COOH (tetrahydropyran-O) 400 | 200 | Cryst $\underset{78}{\overset{85}{\rightleftarrows}}$ SmA $\underset{91}{\overset{78.5}{\rightleftarrows}}$ $\overset{93}{\underset{}{\rightleftarrows}}$ Iso; Sm*C |
| 11 | C$_6$H$_{13}$*CHCH$_2$COO—(Cl)—()—OC$_{12}$H$_{25}$ (OH) | HO—(Cl)—COO—()—OC$_{12}$H$_{25}$  400 | C$_6$H$_{13}$*CHCH$_2$COOH 500 | 250 | Cryst $\underset{63}{\overset{72}{\rightleftarrows}}$ Ch $\underset{79}{\overset{71}{\rightleftarrows}}$ Iso; Sm*C |
| 12 | C$_6$H$_{13}$*CHCH$_2$COO—(Cl)—()—OC$_{12}$H$_{25}$ (OH) | HO—(Cl)—()—OC$_{12}$H$_{25}$  500 | C$_6$H$_{13}$*CHCH$_2$COOH 600 | 300 | Cryst $\overset{81}{\rightarrow}$ Iso $\underset{64.5}{\overset{77}{\rightleftarrows}}$ Ch $\overset{65}{\rightleftarrows}$ Sm*C |
| 13 | C$_6$H$_{13}$*CHCH$_2$COO—()—CH$_2$O—(Cl)—OC$_{12}$H$_{25}$ (OH) | HO—()—CH$_2$O—(Cl)—OC$_{12}$H$_{25}$  500 | C$_6$H$_{13}$*CHCH$_2$COOH 600 | 500 | Cryst $\underset{32}{\overset{59}{\rightleftarrows}}$ SmA $\underset{77}{\overset{45}{\rightleftarrows}}$ $\overset{79}{\rightleftarrows}$ Iso; Sm*C |
| 14 | C$_6$H$_{13}$*CHCH$_2$COO—()—OCH$_2$—(Cl)—OC$_{12}$H$_{25}$ (OH) | HO—()—OCH$_2$—(Cl)—OC$_{12}$H$_{25}$  250 | C$_6$H$_{13}$*CHCH$_2$COOH 400 | 180 | Cryst $\underset{58}{\overset{71}{\rightleftarrows}}$ SmA $\underset{80}{\overset{83}{\rightleftarrows}}$ Iso |
| 15 | C$_6$H$_{13}$*CHCH$_2$COO—(Cl)—COO—()—OC$_{12}$H$_{25}$ (OH) | HO—(Cl)—COO—()—OC$_{12}$H$_{25}$  480 | C$_6$H$_{13}$*CHCH$_2$COOH 400 | 350 | Cryst $\underset{183}{\overset{104}{\rightleftarrows}}$ Sm*C $\overset{116}{\rightleftarrows}$ Iso |

TABLE 2-continued

| Example No. | Compounds | Charged composition (mg) | | Yield (mg) | Phase transition temperature (°C.) |
|---|---|---|---|---|---|
| | | Compounds of Reference Example 7-20 | Compound of Reference Example 2 | | |
| 16 | C₆H₁₃*CHCH₂COO–⟨⟩–COO–⟨⟩–OC₁₂H₂₅ (with Cl substituents); OH | HO–⟨⟩–COO–⟨⟩–OC₁₂H₂₅ (with Cl); 350 | C₆H₁₃*CHCH₂COOH (THP); 400 | 200 | Cryst ⇌(56/37) Sm*A ⇌(87) Iso |
| 17 | C₆H₁₃*CHCH₂COO–⟨⟩–CO–⟨⟩–OC₁₂H₂₅; OH | HO–⟨⟩–CO–⟨⟩–OC₁₂H₂₅; 408 | C₃H₁₃*CHCH₂COOH (THP); 400 | 300 | Cryst ⇌(65/46) SmA ⇌(115) Iso |
| 18 | C₆H₁₅*CHCH₂COO–⟨⟩(Cl)–CO–⟨⟩–OC₁₂H₂₅; OH | HO–⟨⟩(Cl)–CO–⟨⟩–OC₁₂H₂₅; 400 | C₃H₁₃*CHCH₂COOH (THP); 400 | 380 | Cryst ⇌(82/48) Sm*A ⇌(95) Sm*C ⇌(109) Iso |
| 19 | C₆H₁₃*CHCH₂COO–⟨⟩–OCH₂–⟨⟩–OC₁₂H₂₅; OH | HO–⟨⟩–OCH₂–⟨⟩–OC₁₂H₂₅; 408 | C₃H₁₃*CHCH₂COOH (THP); 400 | 250 | Cryst 113 → Iso 107 ↘ SmE 103 |
| 20 | C₆H₁₃*CHCH₂COO–⟨⟩(Cl)–OCH₂–⟨⟩–OC₁₂H₂₅; OH | HO–⟨⟩(Cl)–OCH₂–⟨⟩–OC₁₂H₂₅; 400 | C₃H₁₃*CHCH₂COOH (THP); 400 | 180 | Cryst ⇌(59/32) SmA ⇌(77/45) Sm*C Iso |
| 21 | C₆H₁₃*CHCH₂COO–⟨⟩(Cl)–OCH₂–⟨⟩–OC₁₂H₂₅; OH | HO–⟨⟩(Cl)–OCH₂–⟨⟩–OC₁₂H₂₅; 400 | C₆H₁₃*CHCH₂COOH (THP); 400 | 200 | Cryst ⇌(65/47) Sm*C ⇌(61) Iso |
| 22 | C₆H₁₃*CHCH₂COO–⟨⟩(Cl)–OCH₂–⟨⟩–OC₁₂H₂₅; OH | HO–⟨⟩(Cl)–OCH₂–⟨⟩–OC₁₂H₂₅; 400 | C₆H₁₃*CHCH₂COOH (THP); 400 | 250 | Cryst ⇌(72/50) Iso |

EXAMPLE 23

Compounds corresponding to the compounds obtained in Examples 9 through 15, which contain a fluorine atom at the position corresponding to the position of the chlorine atom in the corresponding compounds, can be similarly synthesized by using fluorine-containing compounds instead of the chlorine-containing compounds used in Examples 9 through 15. The melting points of these compounds are reduced as compared with those of the non-halogen substituted compounds, substantially as in the corresponding chlorine-containing compounds, but the fluorine-containing compounds are not substantially different from the non-halogen-substituted compounds in the temperature of the transition to the chiral smectic C phase. In this point, the fluorine-substituted compounds are distinguishable over the chlorine-substituted compounds in which the above phase transition temperature is much lower than those of the non-halogen-substituted compounds.

REFERENTIAL EXAMPLE 21

Synthesis 4-hexyloxyphenyl 4-octyloxybenzoate

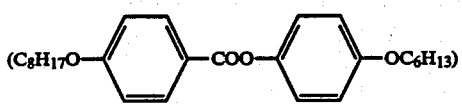

In tetrahydrofuran were dissolved 1.0 g of p-octyloxybenzoic acid chloride and 800 mg of p-hexyloxyphenol, and 500 mg of triethylamine was added to the solution and reaction was carried out with stirring overnight. The precipitate was removed by filtration, and the filtrate was concentrated, purified by using a silica gel column and recrystallized from ethanol to obtain 800 mg of 4-hexyloxyphenyl 4-octyloxybenzoate. The phase transition temperatures of the so-obtained compounds are as follows.

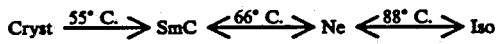

Note, Cryst, Smc, Ne and Iso indicate the crystal phase, the smectic C phase, the nematic phase and the isotropic phase, respectively. Each arrow indicates the transition to the corresponding phase and the temperature shown in the vicinity of the arrow indicates the temperature of the transition to the corresponding phase.

EXAMPLES 24 THROUGH 26

The 4'-hexyloxyphenyl 4-octyloxybenzoate synthesized in Referential Example 21 was mixed with the compound obtained in Example 3, 5 or 7 at a weight ratio of 80/20. The phase transition temperatures of the obtained mixture were measured. The obtained results are shown in Table 3.

As is seen from Table 3, a chiral smectic C phase (Sm*C), which is a ferroelectric phase, appears in each composition.

TABLE 3

| Example No. | Compound mixed with compound of Referential Example 21 | Phase transition temperature (°C.) |
|---|---|---|
| 24 | Compound of Example 2 | Cryst —69→ Ch ←92→ Iso, 35, 69, Sm*C |
| 25 | Compound of Example 5 | Cryst —62→ SmA —75→ Ch ←81→ Iso, 36, 48, Sm*C |
| 26 | Compound of Example 1 | Cryst ←55→ Sm*C ←70→ Ch ←92→ Iso |

Almost all of the compounds of the present invention have a high spontaneous polarization as a ferroelectric liquid crystal, have no discoloration, have an excellent chemical stability such as a resistance to hydrolysis, and have a good photostability. Even compounds not showing a ferroelectric property have excellent properties such that when used as additives to ferroelectric liquid crystals, the spontaneous polarization is increased in liquid crystal compositions, the liquid crystal temperature range is expanded, discoloration does not occur, and the chemical stability and photostability are not degraded. Alternatively, compounds not showing a ferroelectric property can be mixed with a compound showing the SmC phase and having no chiral group to provide a composition showing a chiral Sm*C phase. A liquid crystal composition comprising at least one compound selected from the compounds of the present invention has the above-mentioned characteristics, therefore, is practically valuable.

Conventional liquid crystals have problems in that on receipt of an external shock, the orientation is disturbed and permanent deformation often occurs, and if permanent deformation once occurs, the compounds cannot be used as the liquid crystal any more. In contrast, the liquid crystal composition comprising the compound of the present invention is characterized in that even if the liquid crystal composition receives an external shock, permanent deformation does not occur and the crystal has a high shock resistance.

We claim:

1. A mesomorphic compound having a β-hydroxycarboxyl group as the chiral source, which is represented by the following general formula:

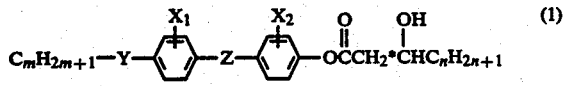

wherein m and n are integers of from 1 to 18, $X_1$ and $X_2$ independently represent fluorine, chlorine or hydrogen, Y represents

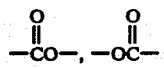

or —O—, Z represents a direct bond,

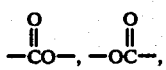

—CH$_2$O— or —OCH$_2$—, and * indicates the asymmetric carbon.

2. A liquid crystal composition comprising at least one mesomorphic compound having a β-hydroxycarboxyl group as the chiral group, which is represented by the general formula (1) indicated in claim 1.

* * * * *

UNITED STATES PATENT AND TRADEMARK OFFICE
CERTIFICATE OF CORRECTION

PATENT NO. : 4,925,591
DATED : May 15, 1990
INVENTOR(S) : Jun Nakauchi, Mioko Uematsu, Keiichi Sakashita, Yoshitaka Kageyama, Seiji Hayashi and Kenji Mori It is certified that error appears in the above-identified patent and that said Letters Patent is hereby corrected as shown below:

On the title page, item [57]:
Abstract, 5th line from the bottom, "-CHhd20-" should be ---$CH_2O$---.

Signed and Sealed this

Fourteenth Day of July, 1992

*Attest:*

DOUGLAS B. COMER

*Attesting Officer*    *Acting Commissioner of Patents and Trademarks*